US 9,248,711 B2

(12) United States Patent
Bilodeau et al.

(10) Patent No.: US 9,248,711 B2
(45) Date of Patent: Feb. 2, 2016

(54) TIRE EXPLOSION SAFETY SYSTEM

(71) Applicant: Centre de recherche industrielle du Quebec, Quebec (CA)

(72) Inventors: Sylvain Bilodeau, Quebec (CA); Jean-Claude Ouellet, St-Jean-Port-Joli (CA); Denis Hotte, L'Ancienne-Lorette (CA); Bertrand Maheux, Quebec (CA)

(73) Assignee: CENTRE DE RECHERCHE INDUSTRIELLE DU QUEBEC, Quebec (CA)

( * ) Notice: Subject to any disclaimer, the term of this patent is extended or adjusted under 35 U.S.C. 154(b) by 292 days.

(21) Appl. No.: 13/902,920

(22) Filed: May 27, 2013

(65) Prior Publication Data
US 2014/0102644 A1    Apr. 17, 2014

Related U.S. Application Data

(60) Provisional application No. 61/713,262, filed on Oct. 12, 2012.

(51) Int. Cl.
*B60C 25/14*    (2006.01)

(52) U.S. Cl.
CPC .................. *B60C 25/147* (2013.04)

(58) Field of Classification Search
CPC ................. B60C 25/147; B60S 5/04
USPC ....................................... 157/1, 19
See application file for complete search history.

(56) References Cited

U.S. PATENT DOCUMENTS

| | | | |
|---|---|---|---|
| 2,407,049 A | 9/1946 | Winarsky | |
| 2,792,056 A | 5/1957 | Ricketts | |
| 3,495,647 A | 2/1970 | Branick | |
| 4,036,274 A | 7/1977 | Peel | |
| 4,057,093 A | 11/1977 | Joines | |
| 4,381,027 A | 4/1983 | Molen | |
| 4,479,522 A | 10/1984 | Lapham | |
| 4,529,019 A | 7/1985 | Blevins | |
| 4,538,659 A | 9/1985 | Adelman | |
| 4,742,859 A | 5/1988 | Mannen | |
| 4,893,569 A | 1/1990 | Hansen | |
| 5,449,031 A | 9/1995 | Burklund | |
| 7,870,883 B2 | 1/2011 | Munroe | |
| 8,333,228 B1 * | 12/2012 | Cunningham | 157/1 |
| 8,695,674 B2 * | 4/2014 | Kliskey et al. | 157/1 |
| 2005/0082013 A1 * | 4/2005 | White | 157/1 |
| 2005/0820130 | 4/2005 | White | |

* cited by examiner

*Primary Examiner* — Hadi Shakeri
(74) *Attorney, Agent, or Firm* — Jean-Claude Boudreau

(57) ABSTRACT

A safety system for containment of explosion when servicing a tire mounted on a rim includes an enclosure capable of receiving the tire and provided with openings to allow passage of air upon tire explosion, and a support device attached to the enclosure for contacting the tire to secure thereof in a servicing position within the enclosure and without contacting the rim. The system also includes a first energy absorbing unit attached to and located within the enclosure to face a first rim side and capable of substantially absorb kinetic energy of first rim parts ejected upon tire explosion. The system further includes a second energy absorbing unit attached to and located within the enclosure to face a second rim side and capable of substantially absorb kinetic energy of second rim parts and any portion of the tire ejected upon tire explosion.

19 Claims, 25 Drawing Sheets

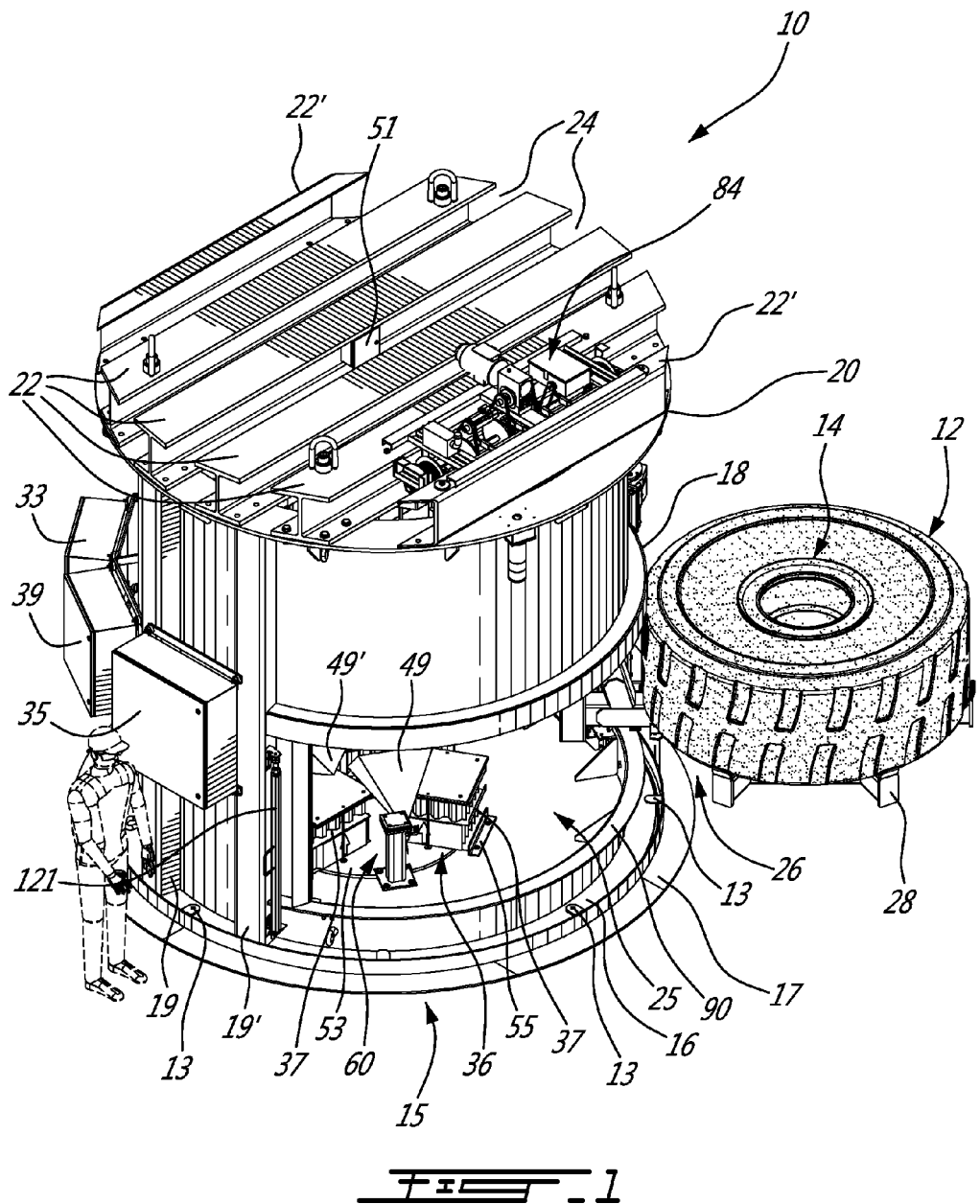

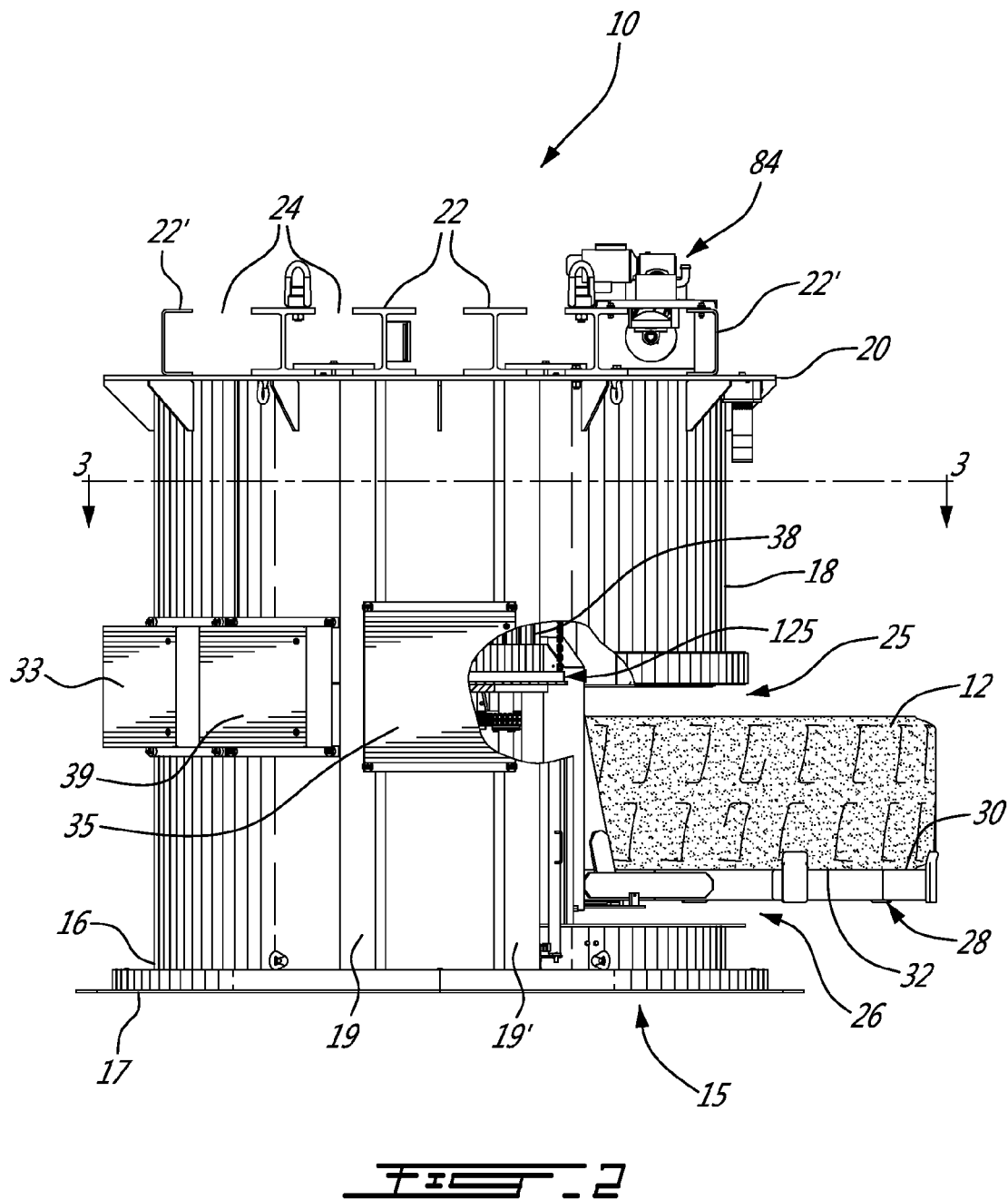
FIG_2

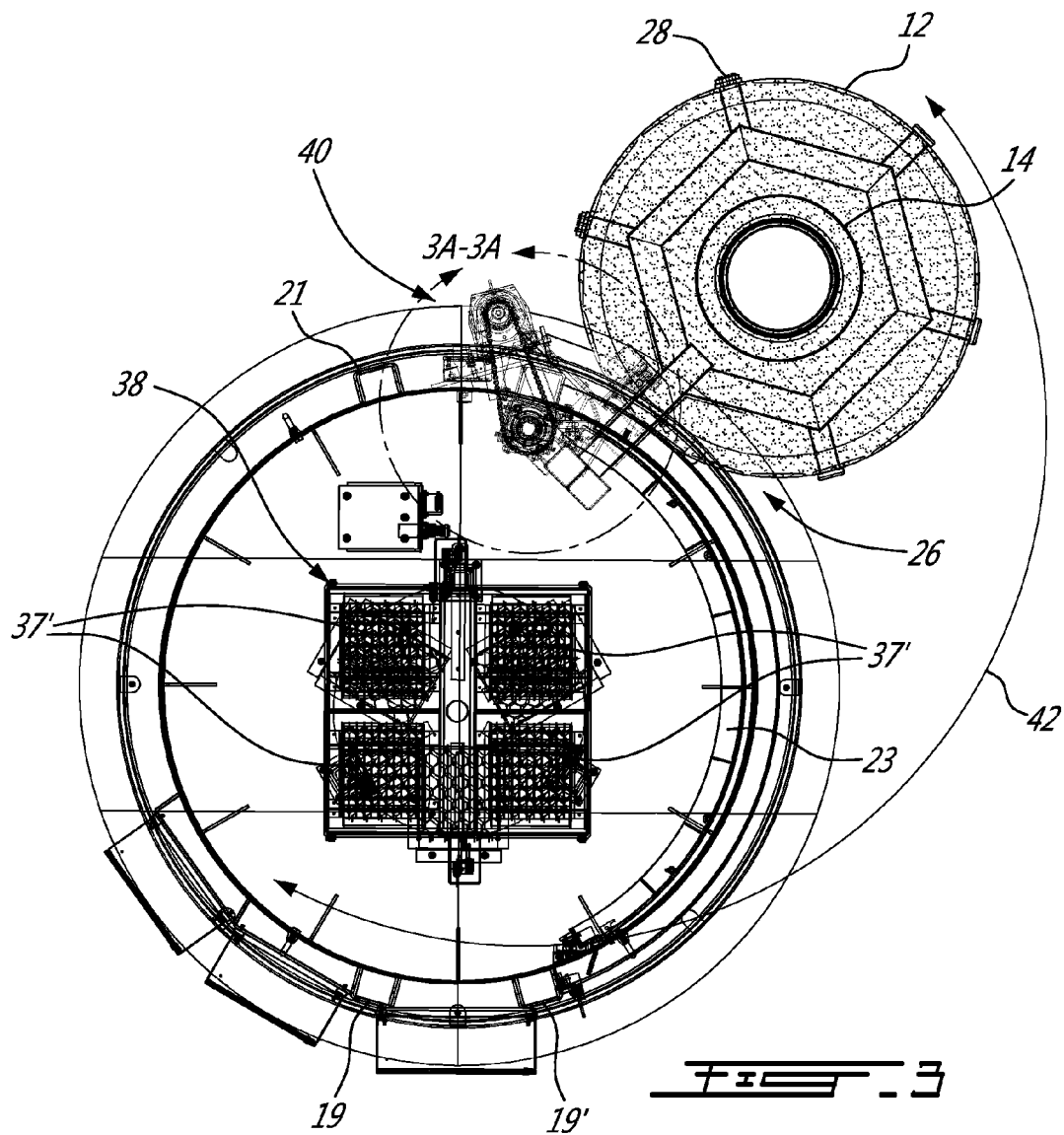
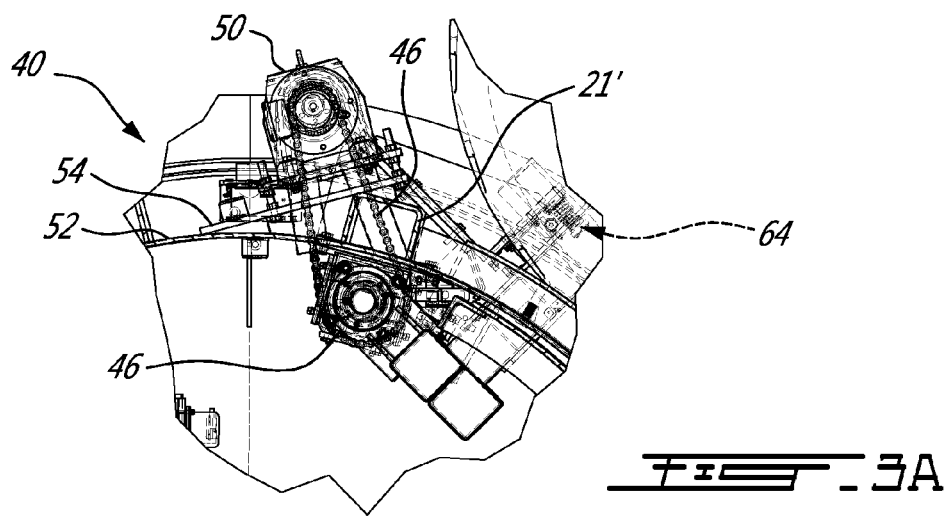

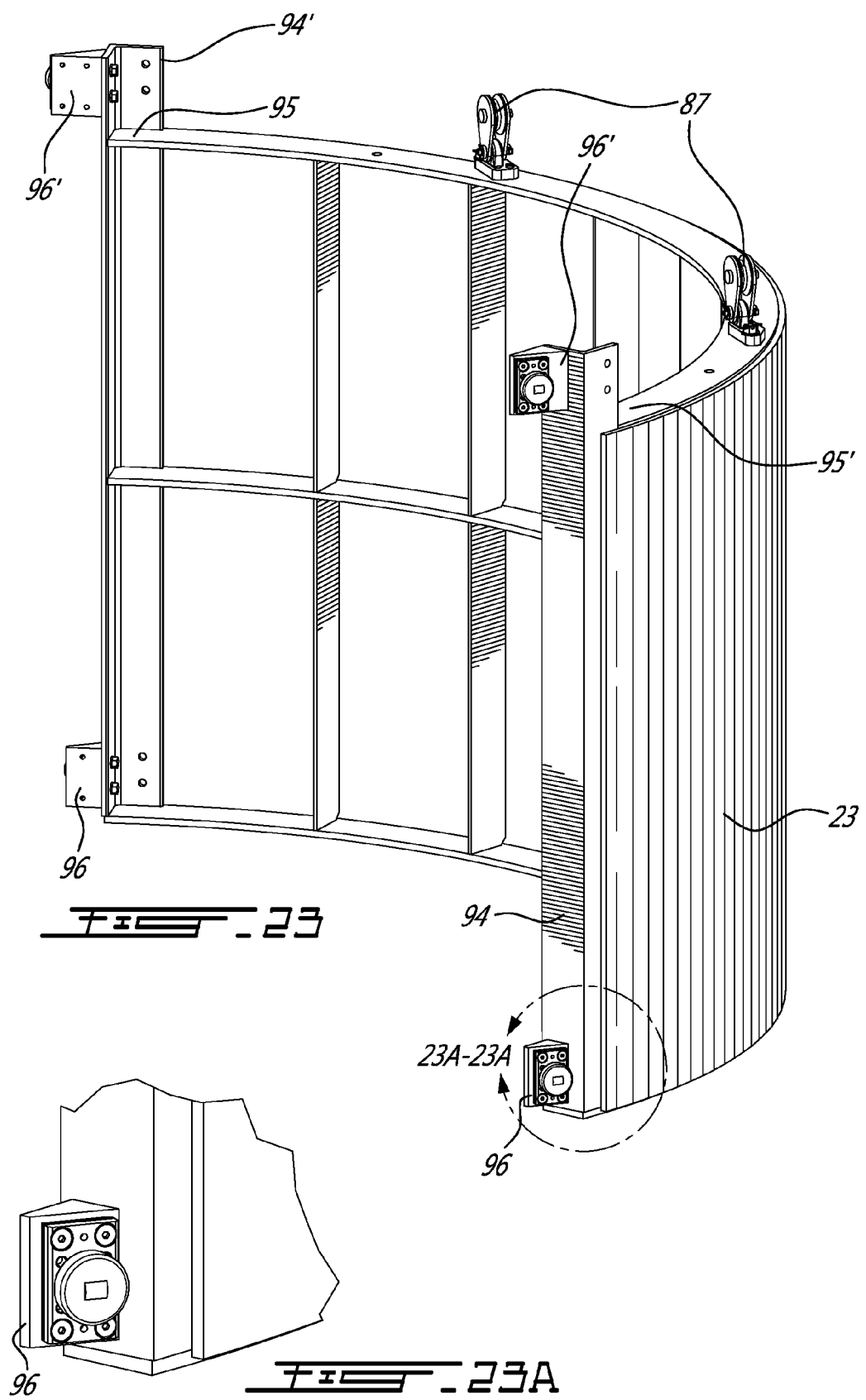

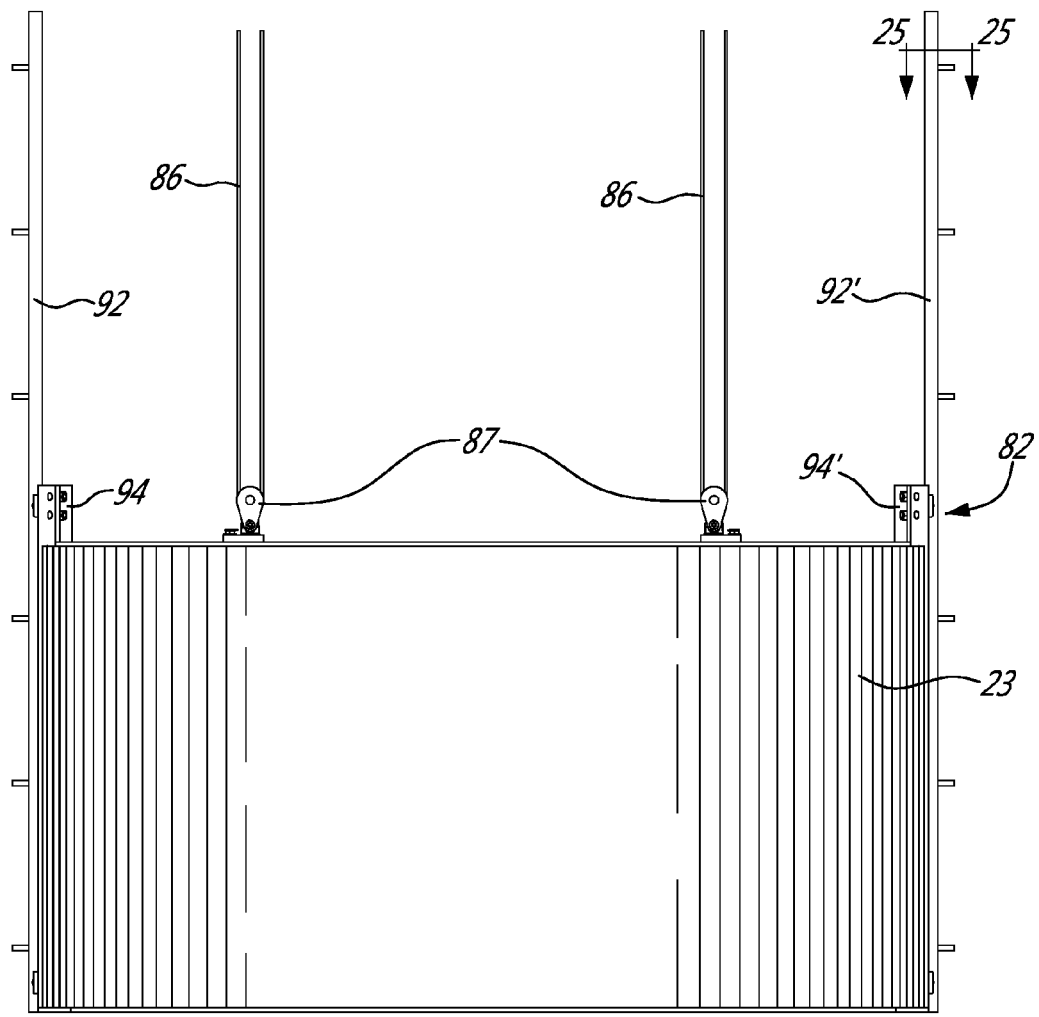
[FIG.] 24
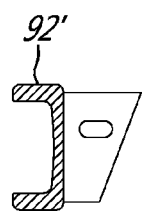
[FIG.] 25

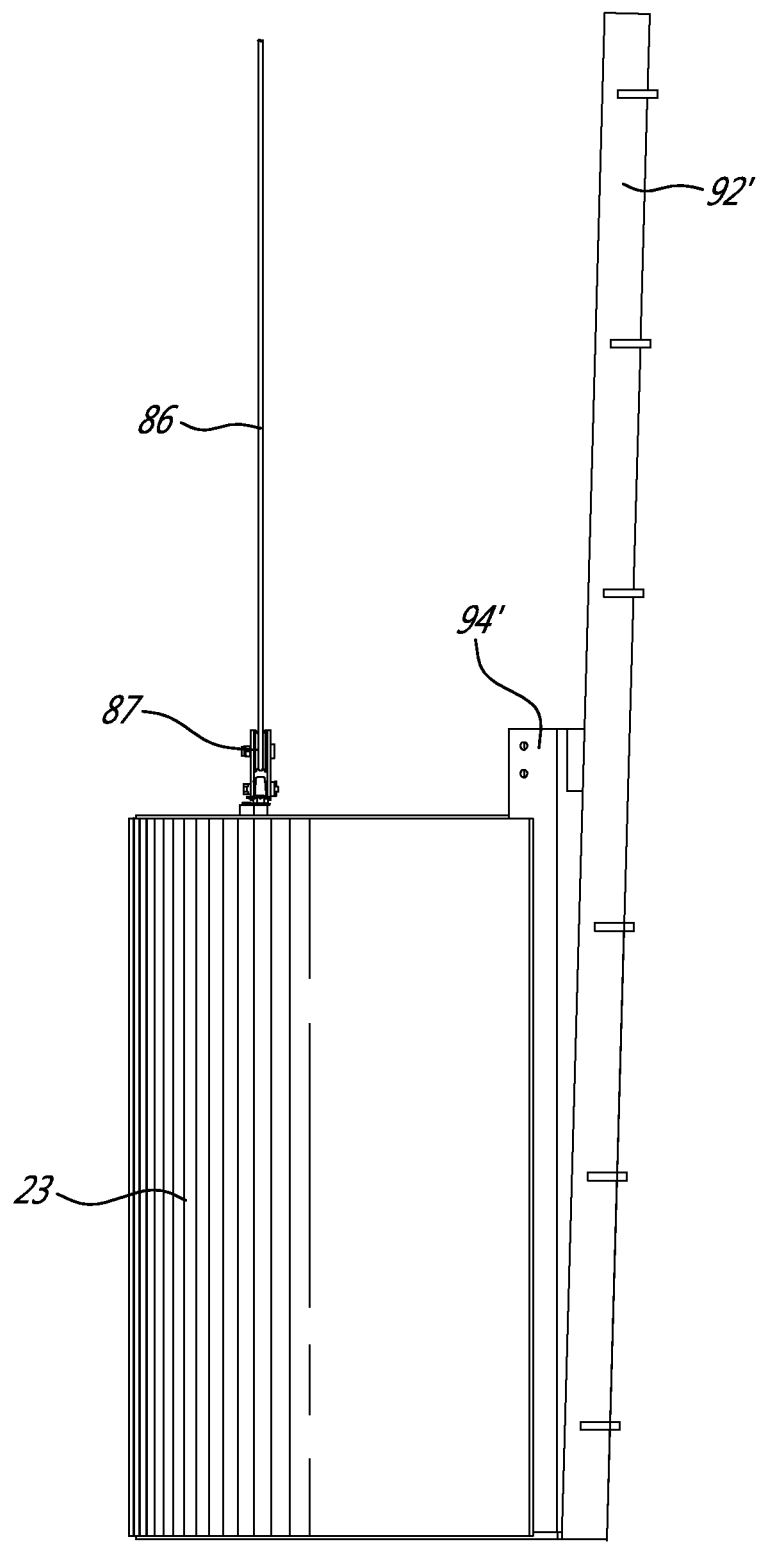

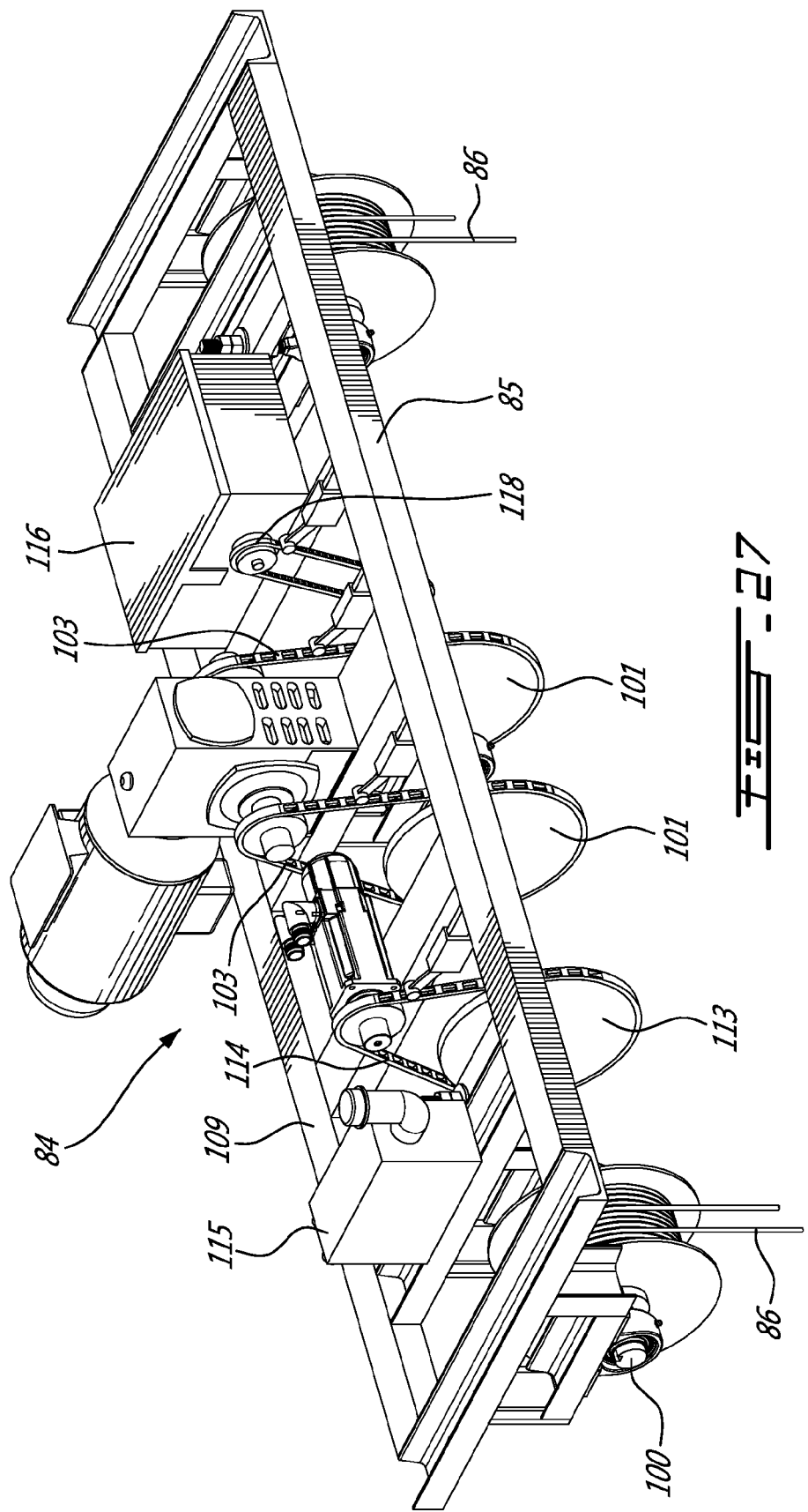

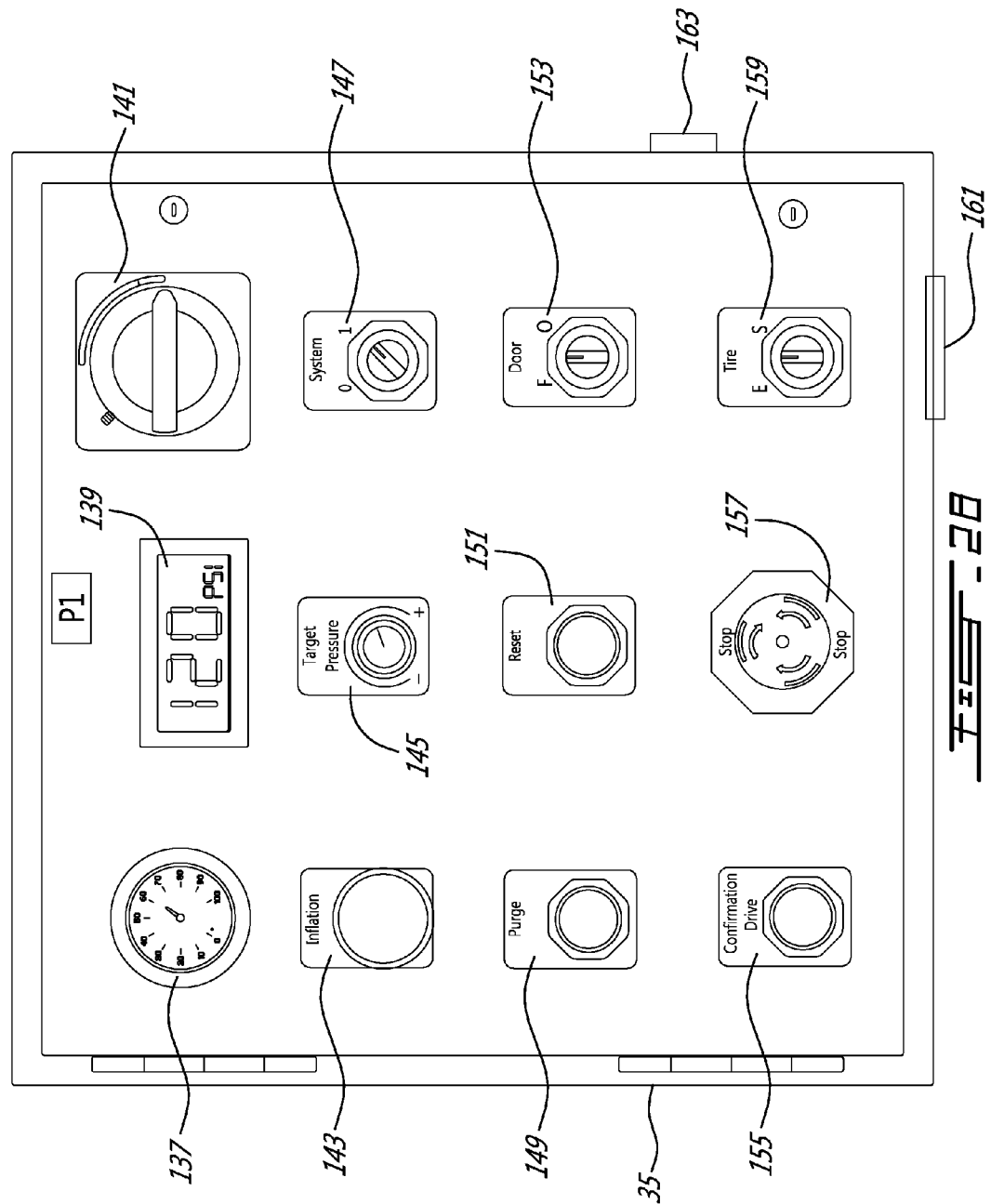

TIRE EXPLOSION SAFETY SYSTEM

FIELD OF THE INVENTION

The present invention relates to the field of tire servicing for mobile equipment, and more particularly to safety systems for containment of explosions that may occur when servicing tires in general, and specifically large ones.

BACKGROUND ART

It is well known that inflating operations required by servicing of tires present a risk for the maintenance personnel in cases of tire explosion. In the past, many systems aimed at protecting operators charged of tire servicing have been proposed, such as disclosed in U.S. published Patent application no. 2005/082013 and in the following U.S. Pat. Nos. 7,240,713; 5,449,031; 4,893,569; 4,742,859; 4,538,659; 4,529,019; 4,479,522; 4,381,027; 4,057,093; 4,036,274; 3,495,647; 2,792,056 and 2,407,049. The typical system disclosed in U.S. Pat. No. 7,240,713 issued to Munroe et al., is in the form of a tire cage including an enclosure made of structural members for receiving tires within its interior using a pedestal for supporting the tire, and one or more layers of an energy absorbing material having a plurality of rigid open cells and disposed between the portion of the interior occupied by the tire and adjacent rigid members. During an explosion of the tire in the enclosure, a crushing of the energy absorbing material is used to absorb kinetic energy of debris from the tire, so as to prevent damage to the enclosure structural member. In an attempt to limit weight of the tire cage, Monroe et al. teaches the use of a light weight energy absorbing material such as an energy absorbing metallic foam to cushion the frame of a tire cage from being damaged by high velocity portions of an exploding tire, and particular, portions of a split rim. However, even using such lightweight absorbing material, Monroe et al. teaches that for typical 8 to 12 foot diameter tires, embodiments of tire cage may be between seven and ten tons or less, which would still represent a significant weight level. So as to safely contain a tire explosion with the tire cage of Monroe et al., the extra volume defined between the portion of the interior occupied by the tire and the adjacent rigid members must be sufficient to house a sufficiently large quantity of energy absorbing material to contain the tire explosion. Accordingly, the frame structural members defining such extra volume made being made of high strength steel, this contributes to increase the overall weight of the system, as well as its manufacturing cost.

SUMMARY OF THE INVENTION

It is a main object of the present invention to provide a tire explosion safety system for servicing tires, which is of a compact, lightweight design and of lower manufacturing cost compared to the typical system of the prior art.

According to the above-mentioned main object, from a broad aspect of the present invention, there is provided a safety system for containment of explosion when servicing a tire mounted on a rim, comprising an enclosure capable of receiving a tire to be serviced and provided with openings to allow passage of air upon tire explosion; a support device attached to said enclosure for contacting said tire to secure thereof in a servicing position within said enclosure and without contacting the rim; a first energy absorbing unit attached to and located within said enclosure to face a first side of said rim and capable of substantially absorb kinetic energy of at least one first rim part ejected toward said first energy absorbing unit upon tire explosion; and a second energy absorbing unit attached to and located within said enclosure to face a second side of said rim and capable of substantially absorb kinetic energy of at least one second rim part and any portion of said tire ejected toward said second energy absorbing unit upon tire explosion.

BRIEF DESCRIPTION OF THE DRAWINGS

Some examples of embodiments of the present invention will now be described in detail with reference to the accompanying drawings in which:

FIG. 1 is an isometric view of a tire explosion safety system shown with its door in open position and with its tire platform disposed outside the enclosure supporting a tire to be serviced;

FIG. 2 is a partially cut-away end view of the tire explosion safety system of FIG. 1;

FIG. 3 is a cross-sectional top view along section lines 3-3 shown in FIG. 2 of the tire explosion safety system of FIG. 1

FIG. 3A is a detail view of the displaceable mechanism used by the tire support device provided on the system of FIG. 1;

FIG. 7A is a detail view of the displaceable mechanism used by the tire support device provided on the system of FIG. 4;

FIG. 7B is a detail view of one of the upper roller and rail assemblies as part of the door slide arrangement provided on the enclosure body portion shown on the system of FIG. 4;

FIG. 23 is an isometric view of the door provided on the system of FIG. 1;

FIG. 23A is a detail view of one of the lower roller devices provided on the door shown in FIG. 23;

FIG. 24 is a front end view of the door of FIG. 23, shown with the door slide arrangement in a door close position;

FIG. 25 is a cross-sectional view along section lines 25-25 of one of the rails provided on the door slide shown on FIG. 24;

FIG. 26 is a side view of the door of FIG. 23, shown with the door slide arrangement in a door close position;

FIG. 27 is an isometric view of the lifting device used to move the sliding door and mounted on the top portion of the system enclosure of FIG. 1;

FIG. 29 shows a camera control panel provided on the system of FIG. 1.

DETAILED DESCRIPTION OF THE EMBODIMENTS

Figure 8:
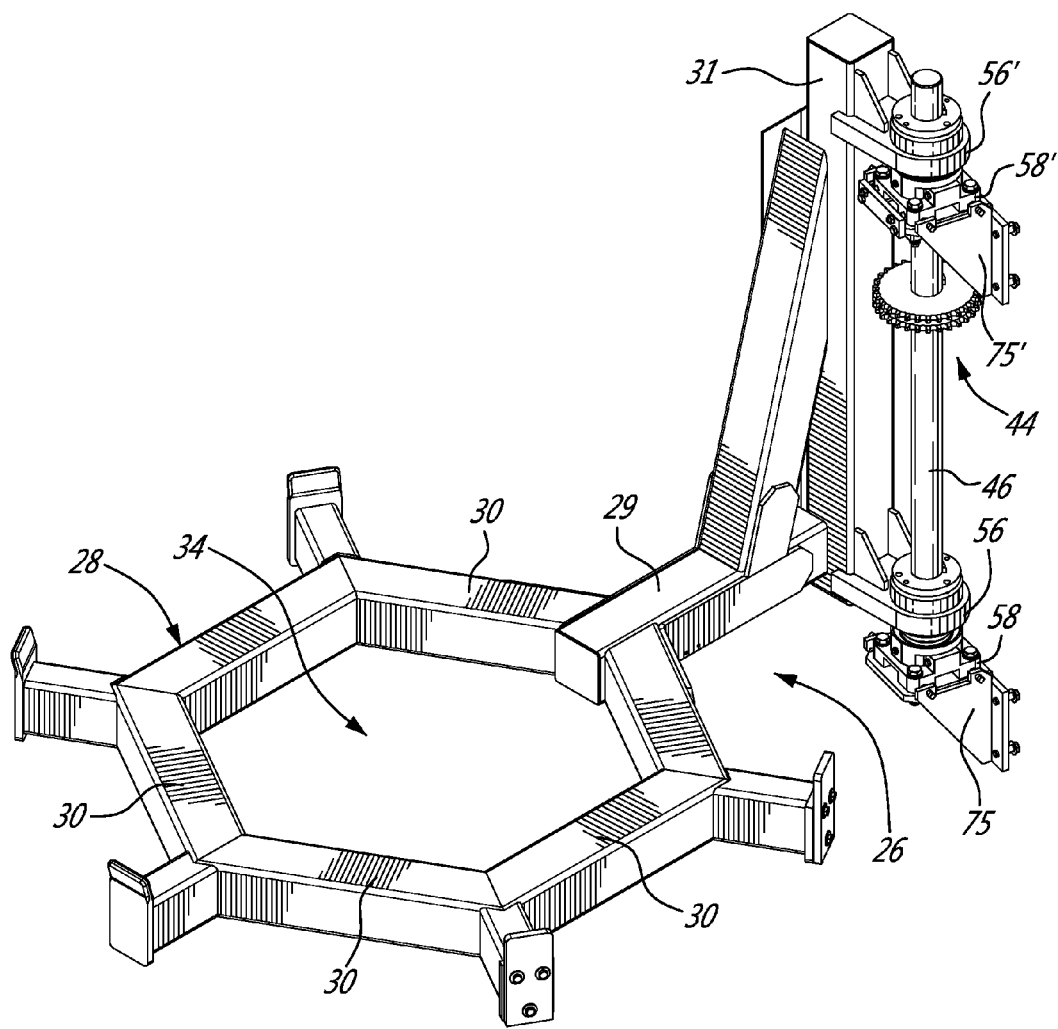
FIG. 8 is an isometric view of the tire support device showing the pivot assembly as part of the displaceable mechanism.

Referring now to FIG. 1 in view of FIG. 2, there is shown an embodiment of tire explosion safety system generally designated at 10, in a position ready to receive a tire 12 to be serviced conventionally mounted on a rim 14, which system 14 being designed for containment of eventual explosion when servicing the tire. The tire rim 14 usually consists of an assembly of several parts, typically a first, main rim part of a cylindrical shape provided with a flange forming a first rim side adapted to mate with a first tire side edge, and a second part of an annular shape provided with a flange forming a second rim side adapted to mate with a second tire side edge, which first and second parts being assembled together using a locking ring. The safety system 14 includes an enclosure 15 capable of receiving the tire 12, which enclosure may be made of hard and strong material such as steel, and of a cylindrical shape to limit the stress induced within the material upon tire explosion. A steel complying with quality standards such C.S.A. G40.21-44W can be used, which steel can be protected by a suitable coating or paint. To provide better stress capacity, the enclosure 15 may be provided with vertical strengthening beams 19, 19' and 21, 21' located along its periphery. The enclosure shown includes a base portion 16, a body portion 18 and a top portion 20 formed by I-beams 22 and U-beams 22' which are arranged in a spaced parallel relationship to provide the enclosure with openings 24 allowing passage of air upon tire explosion. For safety purposes, as shown in dotted lines, a safety ring 17 adapted to surround and freely receive the base portion 16 of the enclosure 15 may be provided in case where a tire explosion causes safety system jumping, followed by heavily dropping thereof on the floor. The ring 17 may be attachable to the base portion of the enclosure 15 for system transportation purposes using brackets 13 with proper fasteners. The system 10 is provided with a pneumatic supply panel 33, an electrical control panel 35, and may be provided with an optional camera control panel 39. The enclosure body portion 18 defines a main opening 25 through which the tire 12 can be received within and removed from the enclosure 15. The enclosure further includes a door 23 as shown in FIG. 3, operationally mounted with respect to the body portion 18 so as to be movable from an open position giving access to the opening 25 as shown in FIGS. 1, 2 and 3, and a closed position for tire servicing as will be described later. For safety purposes, a support leg 121 removably held to the beam 19' with proper brackets may be provided adjacent the opening 25, for being grabbed and disposed by an operator between a flange 90 and the bottom edge of door 23 when brought to its fully open position, so as to ensure that it cannot move downward, thus providing a safe access for operator inside the enclosure. The safety system 10 further includes a support device generally designated at 26 attached to the enclosure 15, for contacting the tire 12 to secure thereof in a servicing position within the enclosure and without contacting the rim 14. The support device 26 includes a platform 28 shown in FIGS. 1, 2 and 3 outside the enclosure 15 for supporting the tire 12 to be serviced, which platform is rigidly held by an arm assembly 29 secured to a base assembly 31 also part of the support device 26, as shown in FIG. 8. The platform 28 has a bearing surface contacting a first side 32 of tire 12 as shown in FIG. 2 in view of FIG. 8, and defining an opening 34 substantially aligned with the first rim side to provide clearance for the first rim part ejected toward a first energy absorbing unit upon tire explosion, as designated at 36 in FIG. 1, which first energy absorbing unit is attached to and located within the enclosure 15 to face the first rim side, and is capable of substantially absorb kinetic energy of at least the first rim part ejected toward that first unit 36 upon tire explosion. In the presently described embodiment, the first energy absorbing unit 36 rests on a base plate 53 and is located under the support device 26 when disposed in the servicing position shown in FIG. 5 and in view of FIG. 10. Connected to the pneumatic supply panel 33 is an air supply line 27 provided for inflating the tire 12 as part of servicing operations. The first energy absorbing unit 36 may include one or more cartridges 37 crushable upon impact of the ejected first rim part. In the presently described embodiment, it can be seen from FIGS. 1, 5 and 10 that the first energy absorbing unit 36 includes a plurality of crushable cartridges 37 disposed in a substantially symmetrical arrangement to face corresponding peripheral portions of the rim first side. As shown in FIG. 1, a stopper 55 secured to the enclosure base portion 16 may be provided adjacent each cartridge 37 to restrict movement thereof upon a tire explosion. The first energy absorbing unit 36 provided on the safety system 10 according to the present embodiment is designed with three crushable cartridges model QuadGuard™ II from Energy Absorption Systems, Inc. (Chicago, Ill.), usually used as crash cushion for roadway safety, to absorb the kinetic energy from the impact of an ejected first rim part of a 25 inch width rim on which is mounted a typical 6 feet diameter, 30 inch width truck tire. The arrangement of crushable cartridges can be symmetrical with reference to a central axis defined by the clearance opening 34 of the platform 28, to allow passage of air toward the base portion 16 upon tire explosion. Optionally, the crushable cartridges may be covered by a first noise barrier, such as a rubber curtain, which can be perforated in the area between the cartridges to allow passage of air upon tire explosion.

Figure 5:
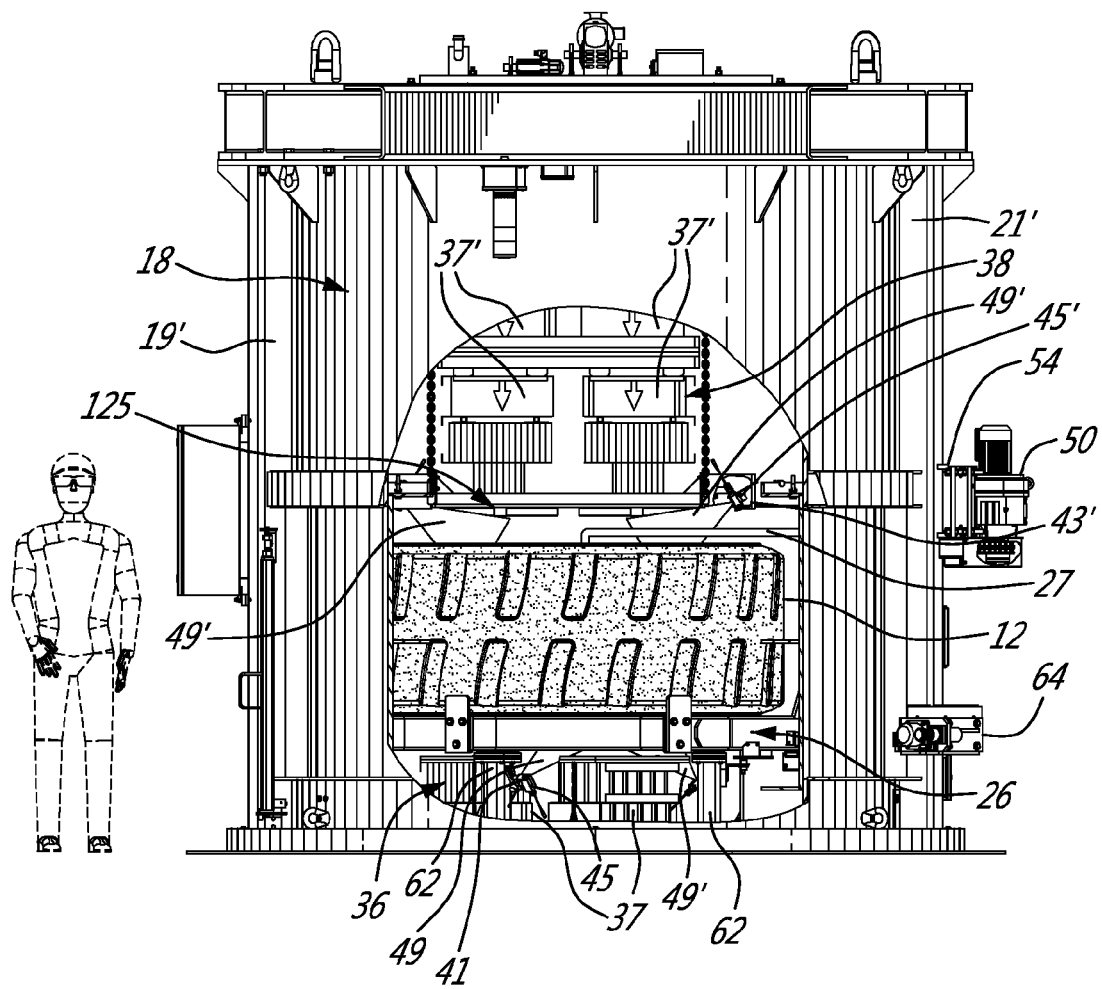
FIG. 5 is a partially cut-away side view of the tire explosion safety system of FIG. 4.
Figure 6:
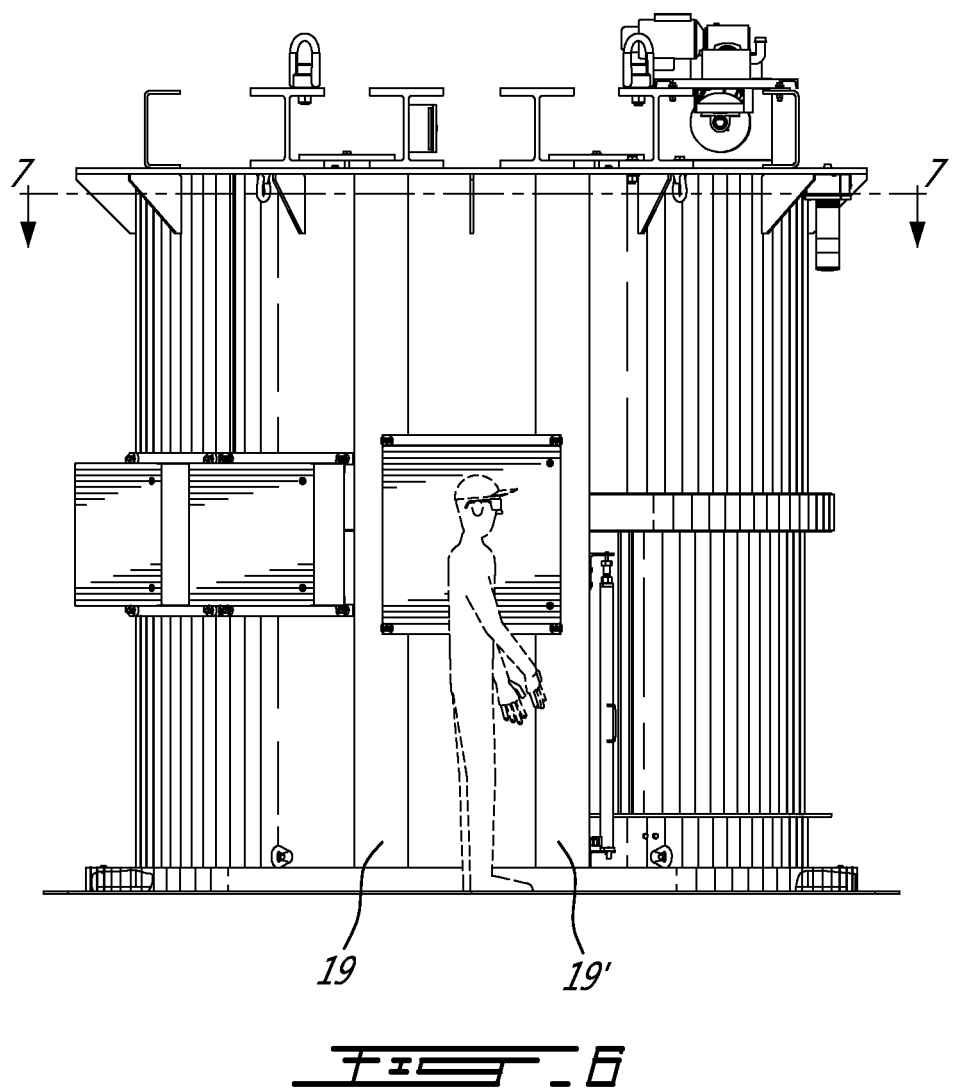
FIG. 6 is a side view of the tire explosion safety system of FIG. 1.
Figure 7:
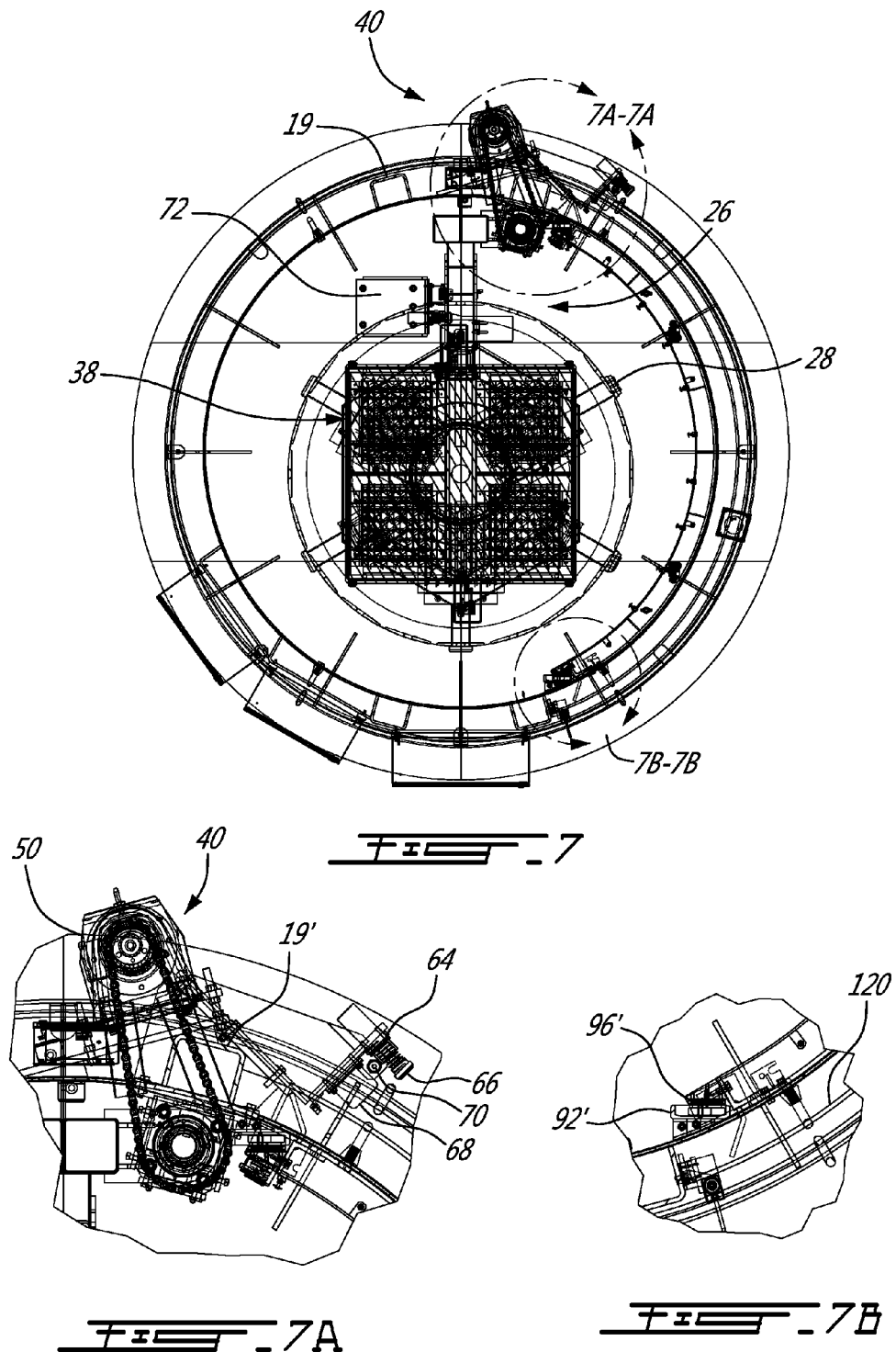
FIG. 7 is a cross-sectional top view along section lines 7-7 shown in FIG. 6 of the tire explosion safety system of FIG. 4.
Figure 16:
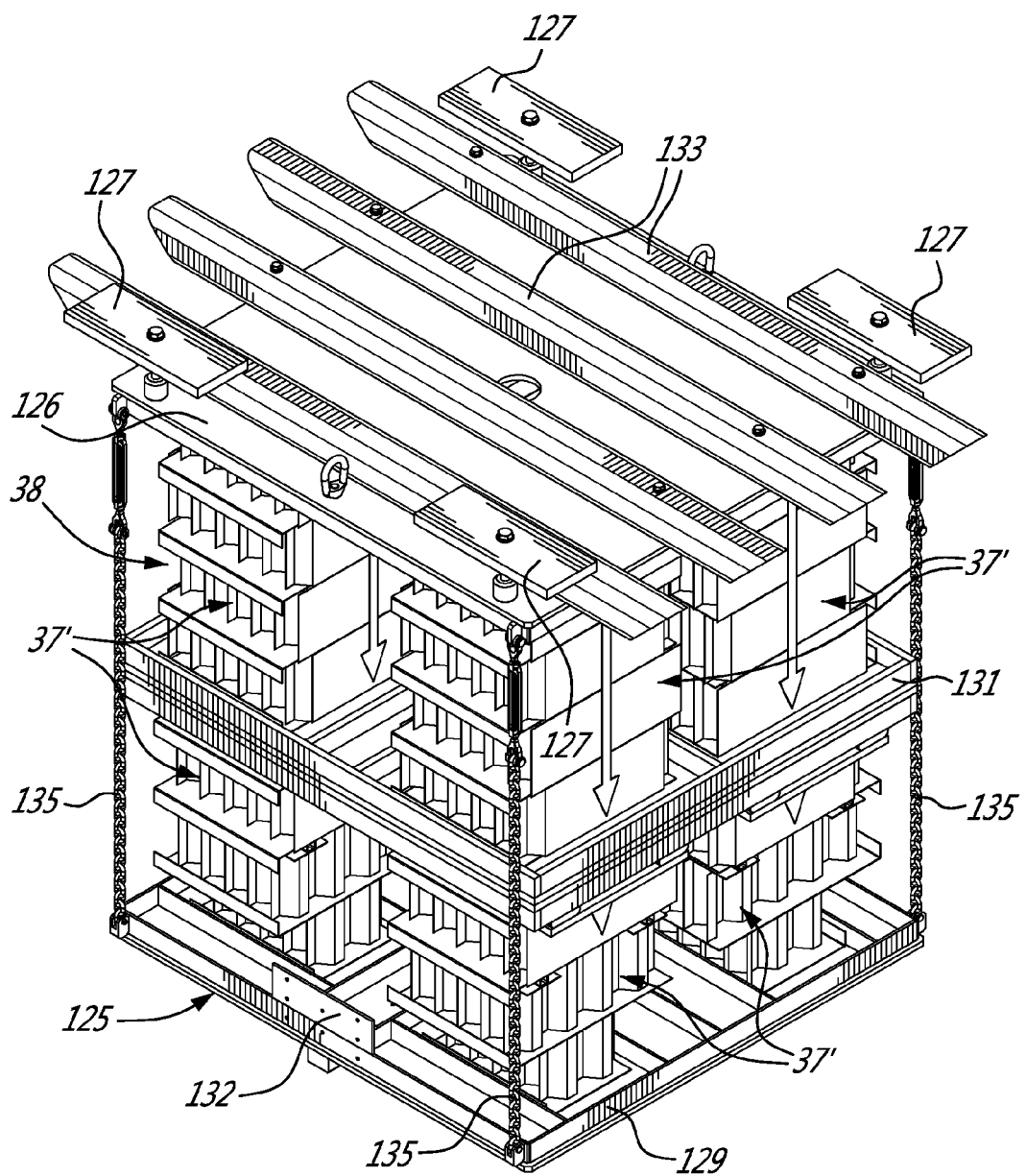
FIG. 16 is an isometric view of the second energy absorbing unit provided on the system of FIG. 1.
Figure 16A:
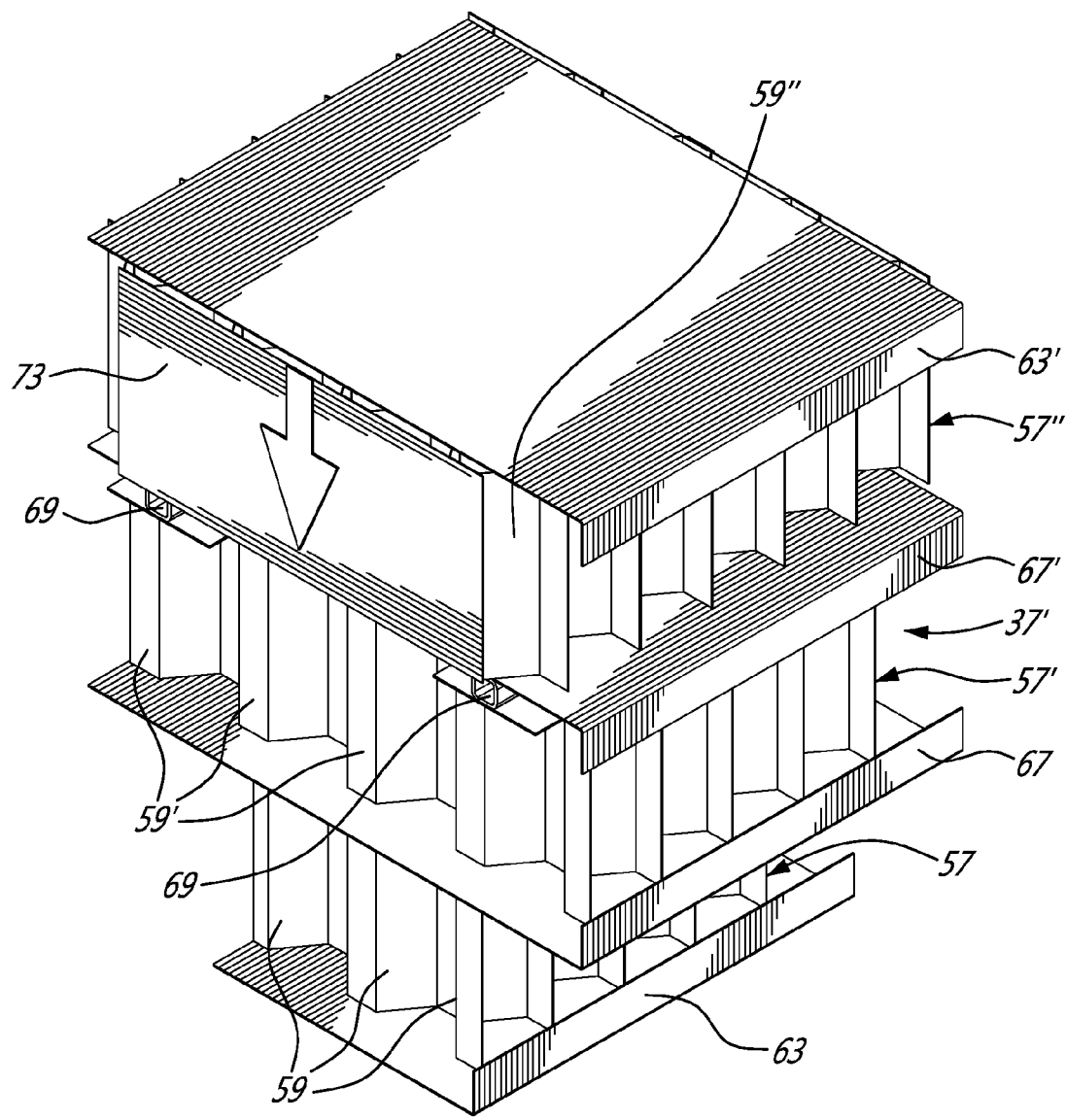
FIG. 16A is a detailed view of a cartridge provided on the energy absorbing unit of FIG. 16.

As shown in FIGS. 2 and 3, the system 10 further includes a second energy absorbing unit generally designated at 38, which is attached to and located within the enclosure 15 to face the second rim side, and is capable of substantially absorb kinetic energy of at least the second rim part as well as any portion of tire ejected toward that second unit 38 upon tire explosion. In the presently described embodiment, as shown in FIGS. 5 and 7, the second energy absorbing unit 38 is located above the support device 26 and tire 12 in the servicing position. The second energy absorbing unit 38 may include one or more cartridges 37' crushable upon impact of the ejected second rim part and any ejected portion of the tire 12 as a result of its explosion. In the presently described embodiment, it can be seen from FIG. 16 in view of FIGS. 3 and 5 that the second energy absorbing unit 38 includes a plurality of crushable cartridges 37' supported on a holder 125 conveniently attached to the enclosure top portion 20 shown in FIG. 1, using mounting plates 127 to which is attached a holder top plate 126. A plurality of horizontal strengthening beams 133 disposed in a spaced relationship are rigidly attached to the top plate 126. The second energy absorbing unit 38 provided on the safety system 10 according to the present embodiment is designed with eight crushable cartridges model QuadGuard™ II from Energy Absorption Systems, Inc. (Chicago, Ill.) to absorb the kinetic energy from the impact of an ejected second rim part of a 25 inch width rim as well as from any ejected portion of a typical 6 feet diameter, 30 inch width truck tire mounted on the rim. The cartridge holder 125 shown in FIG. 16 is provided with a base tray 129 on which the cartridges 37' are disposed for spreading the energy upon impact of the ejected second rim part and any ejected portion of tire. The base tray 129 is held to the top plate 126 using adjustable chains 135 having their opposed ends respectively attached to the corners of tray 129 and plate 126. A plurality of arrangements of cartridges 37' can be stacked and separated by one or more intermediary energy spreading trays made of suitable material such as wood. In the example of FIG. 16, two arrangements of four cartridges 37' are provided, using a two-part intermediary tray 131 designed to maintain each cartridge 37' in a proper position relative to the other cartridges. Referring now to FIG. 16A, an arrangement of energy absorbing elements constituting the lower cartridge 37' used in the present embodiment is shown, which arrangement consists of three superimposed arrays 57, 57', 57" of absorbing elements respectively designated at 59, 59' 59", each being formed by a plurality of vertically extending crushable walls connected in a geometrical configuration to define cavities. In the embodiment shown, the arrays are assembled between bottom and top grates 63, 63' with intermediary grates 67, 67' and transverse beams 69, and it can be seen that the lowermost array 57 includes a lesser number of energy absorbing elements to provide a lower deceleration factor for the upwardly ejected matter resulting from the explosion, in order to reduce stress on the system and reduce the jumping effect. A covering wall 73 provided with an arrow indicating the installation orientation may also be affixed to the cartridge side. It is to be understood that various arrangements involving a different number of arrays or different numbers of elements in arrays may be used depending of the characteristics of the tire to be serviced.

Figure 9:
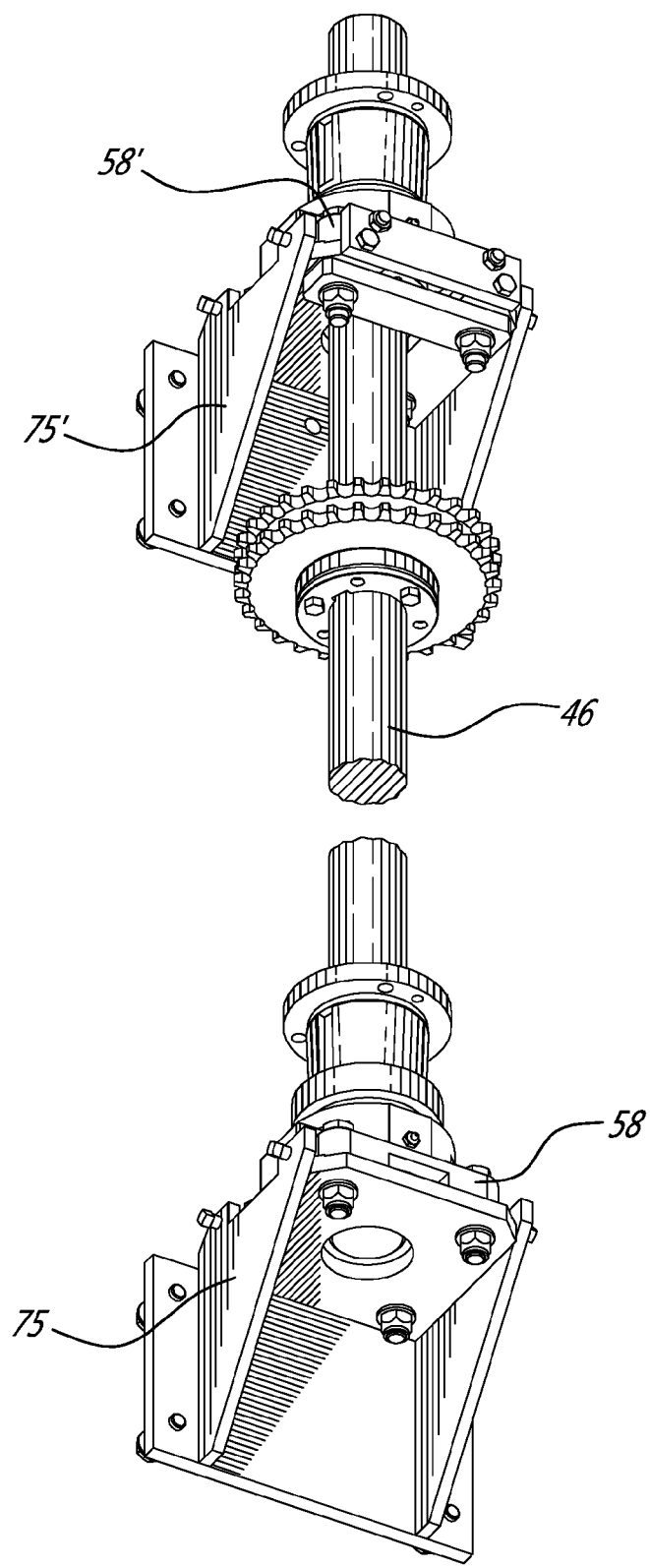
FIG. 9 is an isometric view of the pivot assembly as part of the displaceable mechanism shown on FIG. 8.

Referring now to FIGS. 3-3A and 7-7A, the platform 28 is attached to the enclosure 15 through a displaceable mechanism generally designated at 40 operable along a trajectory indicated by arcuate arrow 42 between a first position shown in FIG. 3 wherein the platform 28 is disposed outside the enclosure 15 allowing placement of the tire 12 on the support device 26, and a second position shown in FIGS. 5 and 7 wherein the platform 28 is disposed inside the enclosure 15 to secure the tire 12 in the servicing position. In the shown embodiment, the platform as part of the support device 26 is pivotally attached to the enclosure 15, and the displaceable mechanism 40 is designed to provide pivotal movement as better shown in FIG. 7A in view of FIGS. 5, 8, 9 and 18, by including a pivot assembly 44 provided with a geared shaft 46 operatively coupled through a driving chain 48 passing through channels 47 provided on the enclosure lateral wall 52, to a drive motor 50 conveniently secured through a mounting assembly 54 to the outer surface of lateral wall 52 and adjacent vertical beam 21 as shown in FIG. 5. Referring again to FIGS. 8 and 9, the shaft 46 is mechanically coupled to the base assembly 31 through lower and upper ears 56, 56', while being supported for pivotal movement on appropriate bearings as part of lower and upper support assemblies 58, 58' which are adapted to be secured though respective mounting arrangements 75, 75' to the inner surface of enclosure wall 52 shown in FIG. 3A.

Figure 13:
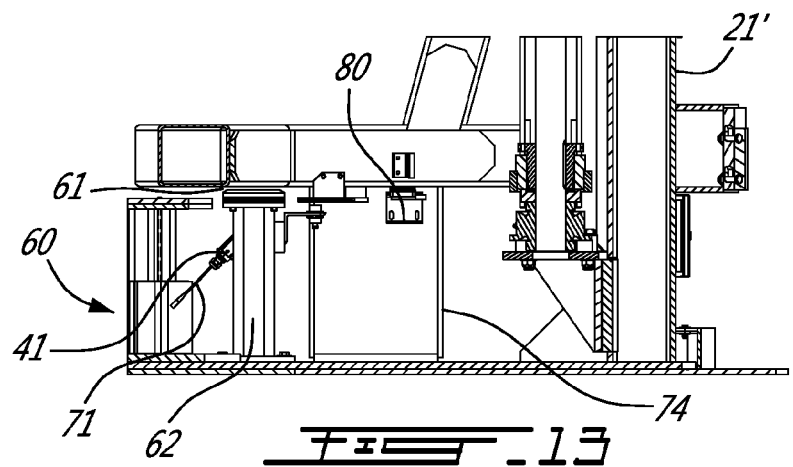
FIG. 13 is a partial cross-sectional view along section lines 13-13 shown in FIG. 10 of the enclosure body and base portions, showing the platform arm, second travel limiting unit and displaceable mechanism of the tire support device.
Figure 14:
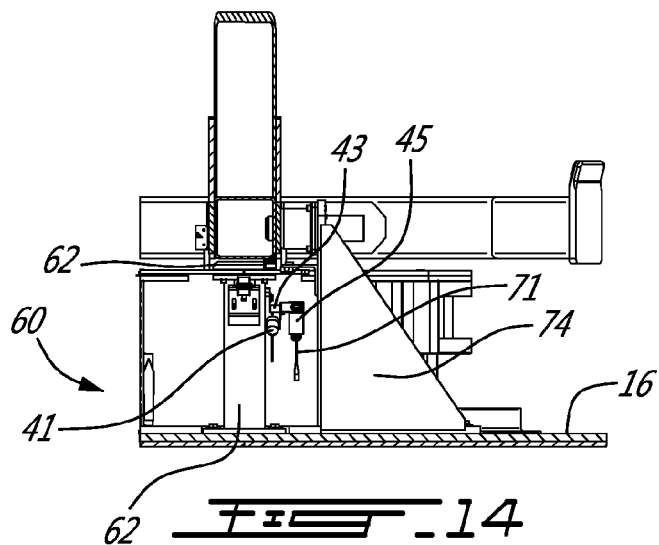
FIG. 14 is a partial cross-sectional view along section lines 14-14 shown in FIG. 10 of the platform arm and second travel limiting unit.
Figure 15:
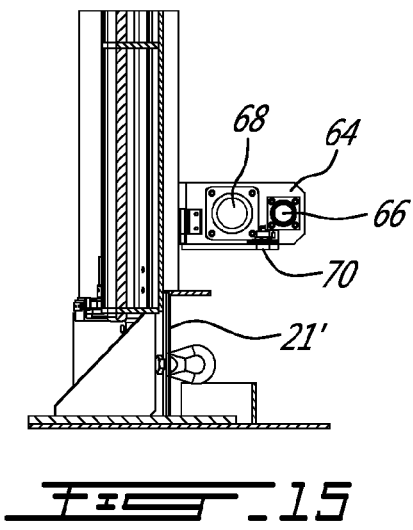
FIG. 15 is a partial cross-sectional view along section lines 15-15 shown in FIG. 10 of the enclosure body and base portions, showing the first travel limiting unit as part of the tire support device.

Referring again to FIG. 1 in view of FIGS. 5, 10, 13 and 14, the safety system may include a stopper arrangement generally designated at 60 attached to and located within the enclosure 15 to be disposed between the platform 28 and the enclosure base portion 16 in a close proximity relationship beneath the platform 28, as indicated by a small gap 61 shown in FIGS. 13 and 14, when the platform 28 is disposed inside the enclosure 15, to limit the movement of the platform 28 upon tire explosion. Conveniently, the stopper arrangement 60 may include a plurality of posts 62 distributed with respect to the support 26 to spread the impact forces accordingly.

Turning back to FIG. 3A in view of FIGS. 4, 5, 7A, 15 and 18, the tire support device 26 may include a first travel limiting unit 64 conveniently attached using a mounting plate 65 to the vertical beam 21' and provided with a coil spring 66 and a stopper 68 made of a resilient material, in order to ensure that the support device 26 cannot move beyond that limit when moved toward its fully outside position. The first travel limiting unit 64 may also include a first proximity sensor 70 capable of detecting when the base of the arm assembly is reaching a position close to the outside limit, allowing the control of the drive motor 50 to progressively reduce pivoting velocity until complete stopping of the support device 26. The motor 50 can also be provided with a controlled brake system.

Turning back to FIG. 7 in view of FIGS. 10, 10B, 13 and 14, the tire support device 26 may further include a second travel limiting unit 72 conveniently attached to the enclosure base portion through a stand 74 and provided with a coil spring 76 and a stopper 78 made of a resilient material, in order to ensure that the support device 26 cannot move beyond that other limit when moved toward its fully inside position. The second travel limiting unit 72 may also include a second proximity sensor 80 capable of detecting when the base of the arm assembly is reaching a position close to the inside limit, allowing the control of the drive motor 50 to progressively reduce pivoting velocity until complete stopping of the support device 26.

Figure 10:
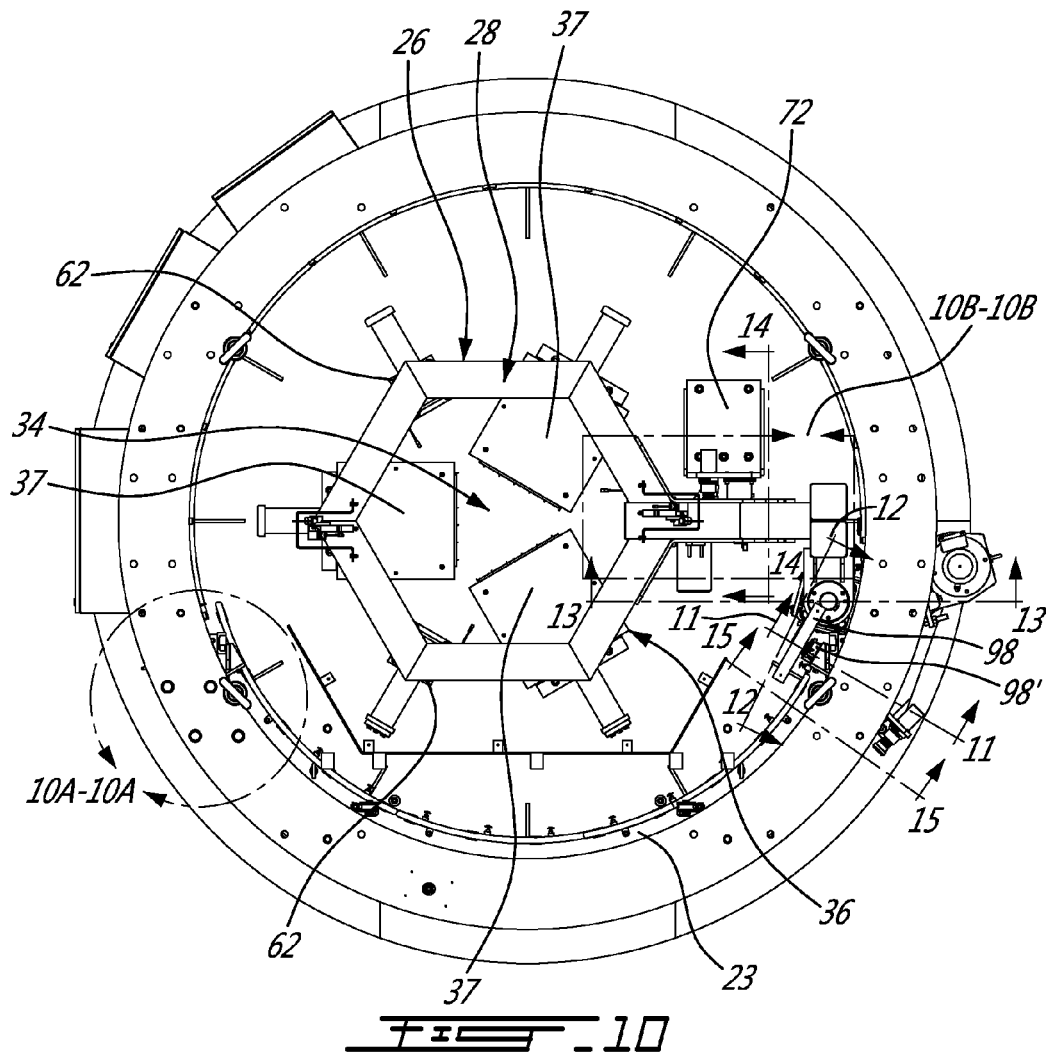
FIG. 10 is a top view of the tire explosion safety system of FIG. 4 without its enclosure top portion and second energy absorbing unit, showing the tire support device and first energy absorbing unit.
Figure 11:
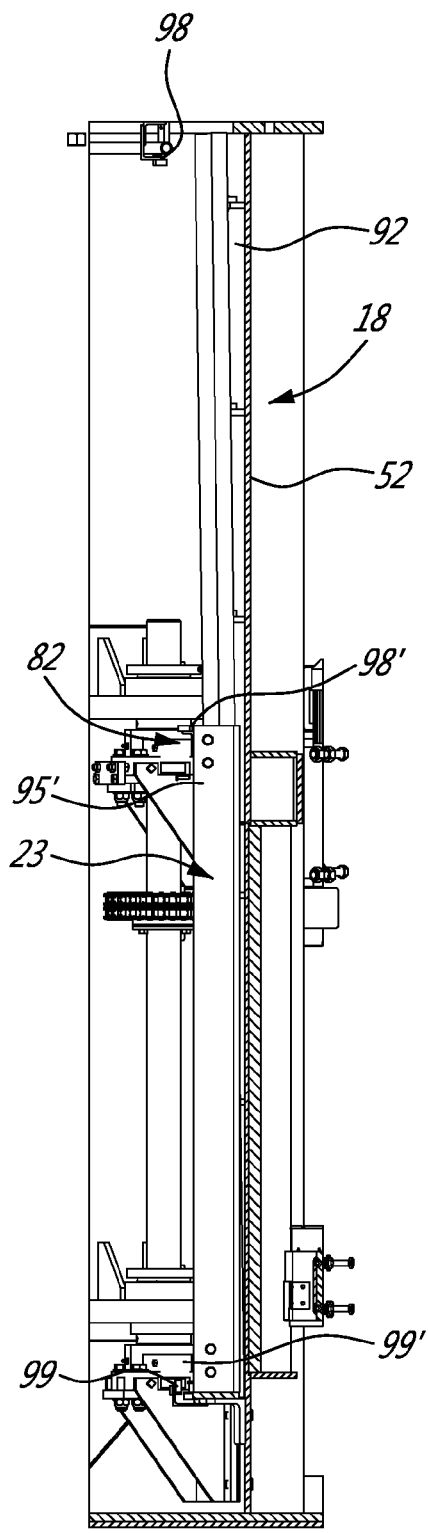
FIG. 11 is a cross-sectional view along section lines 11-11 shown in FIG. 10 of the enclosure body and base portions, showing the door and part of the door slide arrangement in a door close position.
Figure 12:
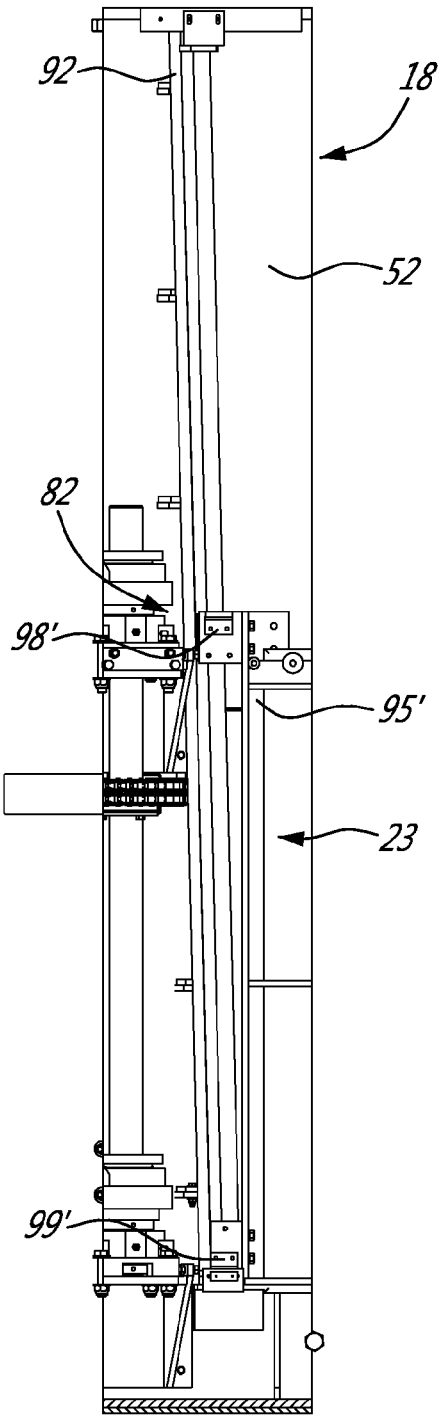
FIG. 12 is partial view along section lines 12-12 shown in FIG. 10 of the door and part of the door slide arrangement in a door close position.
Figure 18:
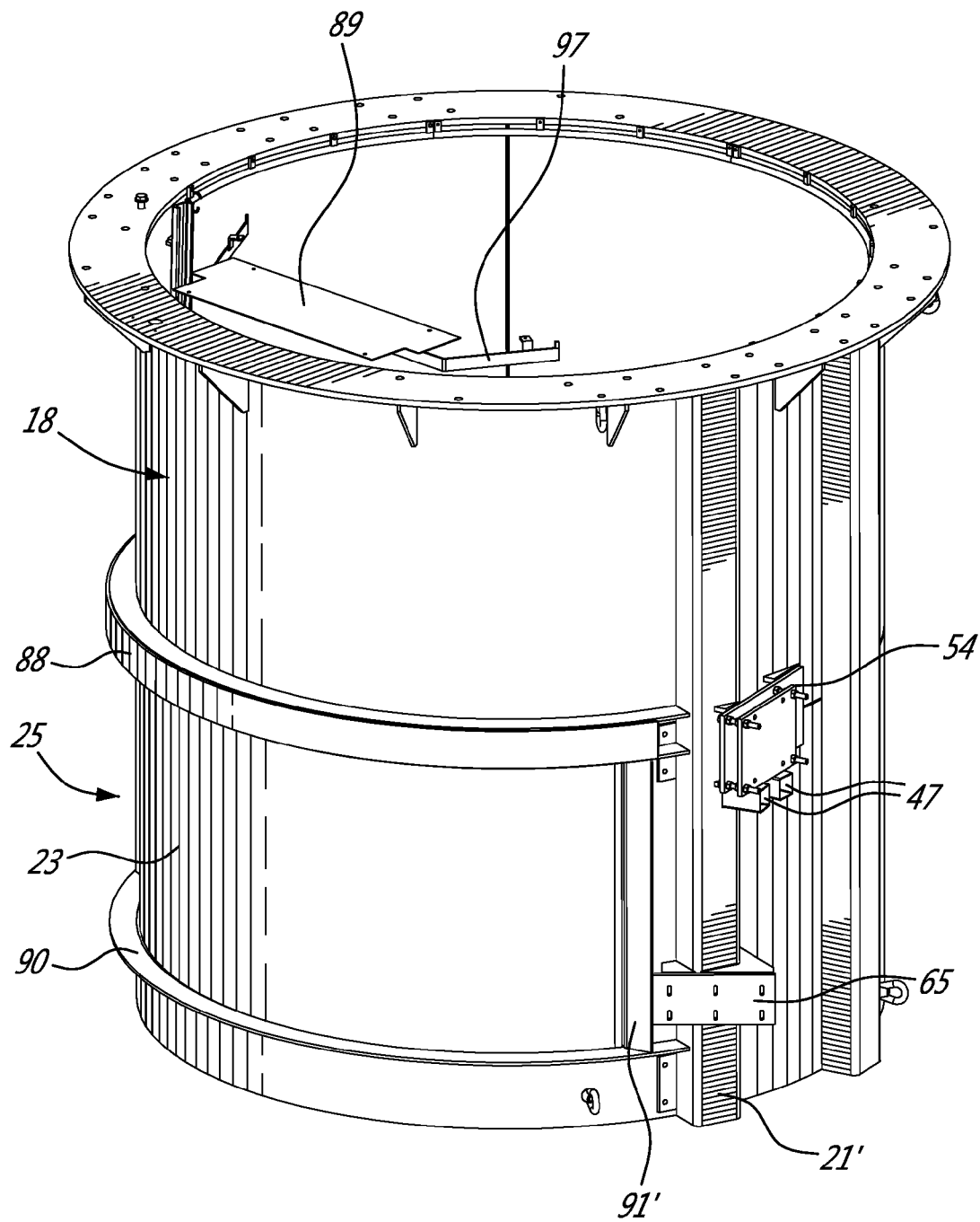
FIG. 18 is another isometric view of the system enclosure with its door in close position, shown without the beams of the enclosure top portion.
Figure 19:
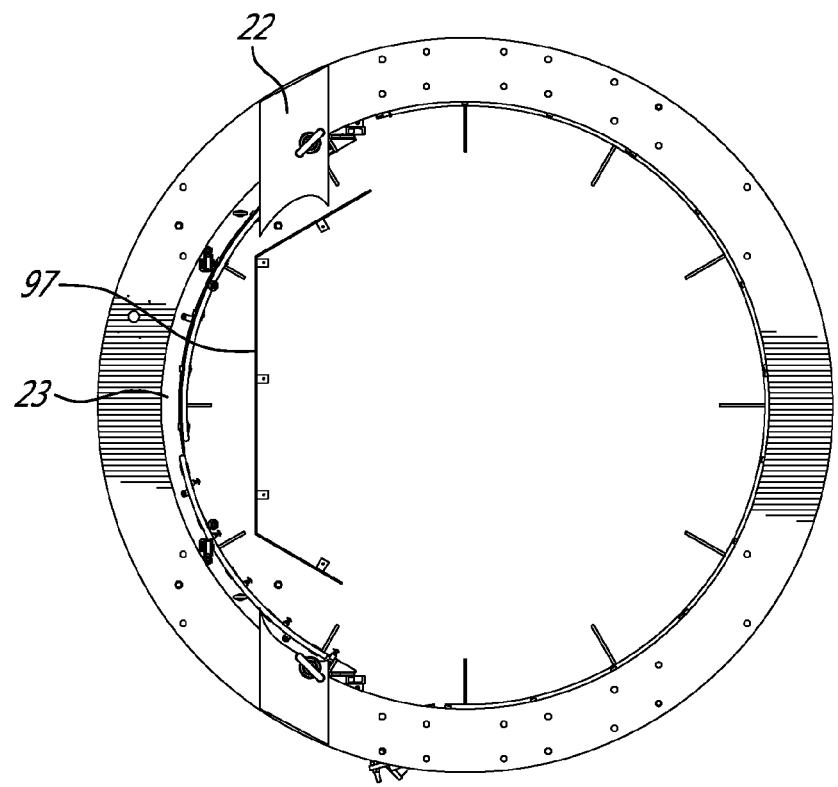
FIG. 19 is a top view of the system enclosure of FIG. 18.
Figure 20:
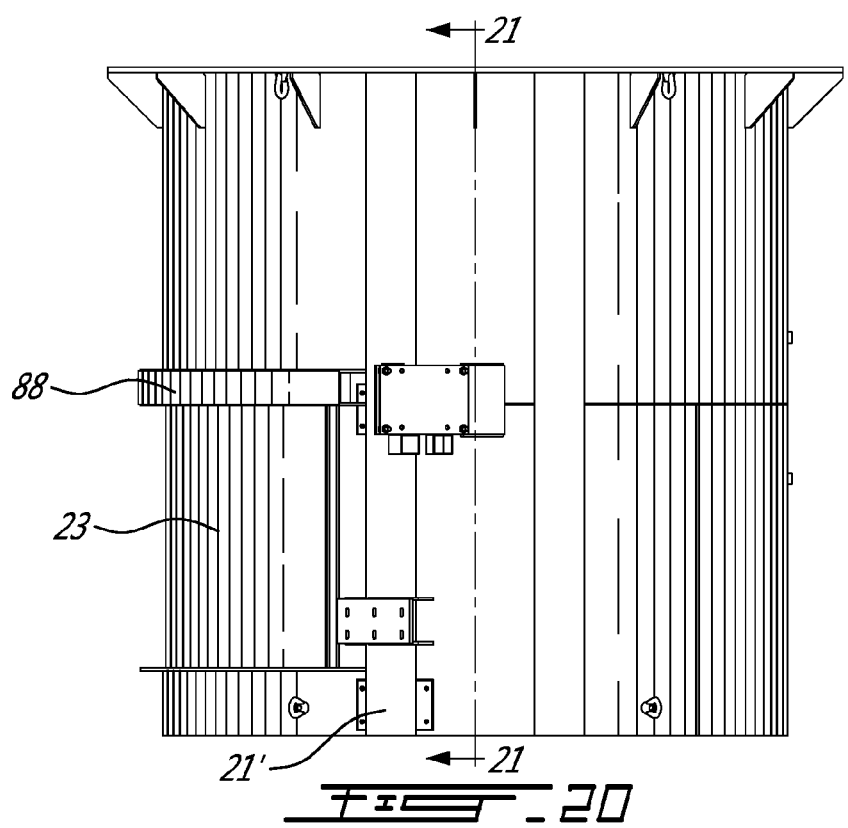
FIG. 20 is an end view of the system enclosure of FIG. 18.

Referring now to FIG. 10 in view of FIGS. 11 and 12, it can be appreciated that the door 23 in the embodiment shown is a sliding door having an arcuate cross-section mating with the inner surface of the cylindrical enclosure 15. The sliding door 23 is coupled to a lifting device 84 generally shown in FIGS. 1 and 2, which device is better shown in FIG. 27 in view of FIG. 21. The lifting device includes a frame 85 secured to the enclosure top portion 20 and on which is mounted for rotation a shaft 100 provided with a pair of main gear wheels 101 operatively coupled through driving chains 103 and gear reducer unit 105, to a drive motor 107 secured to the lifting device frame 109. Mounted at both end of the shaft is a pair of threaded spools 111 on which are wound respective first ends of a pair of cables 86, passing through pulleys 87 secured to the tip edge of door 23, and whose second ends are secured to the frame 85. For safety purposes, a passive hydraulic motor 112 provided with an oil reservoir 115 may be coupled to the shaft through further geared wheel 113 and chain 114 to provide damped descent of door 23 in case of driving malfunction. Furthermore the shaft 100 may be coupled to a control unit 116 through a wheel 118. Such lifting device is manufactured by ProFab 2000, Inc. (Quebec, Canada). To protect the lifting device 84 against any projected matter resulting from a tire explosion, a shielding plate 89 may be mounted under the lifting device 84 using an appropriate support 97 secured to the bottom surface of an adjacent I-beam 22 as shown in FIG. 18 in view of FIG. 19.

Figure 4:
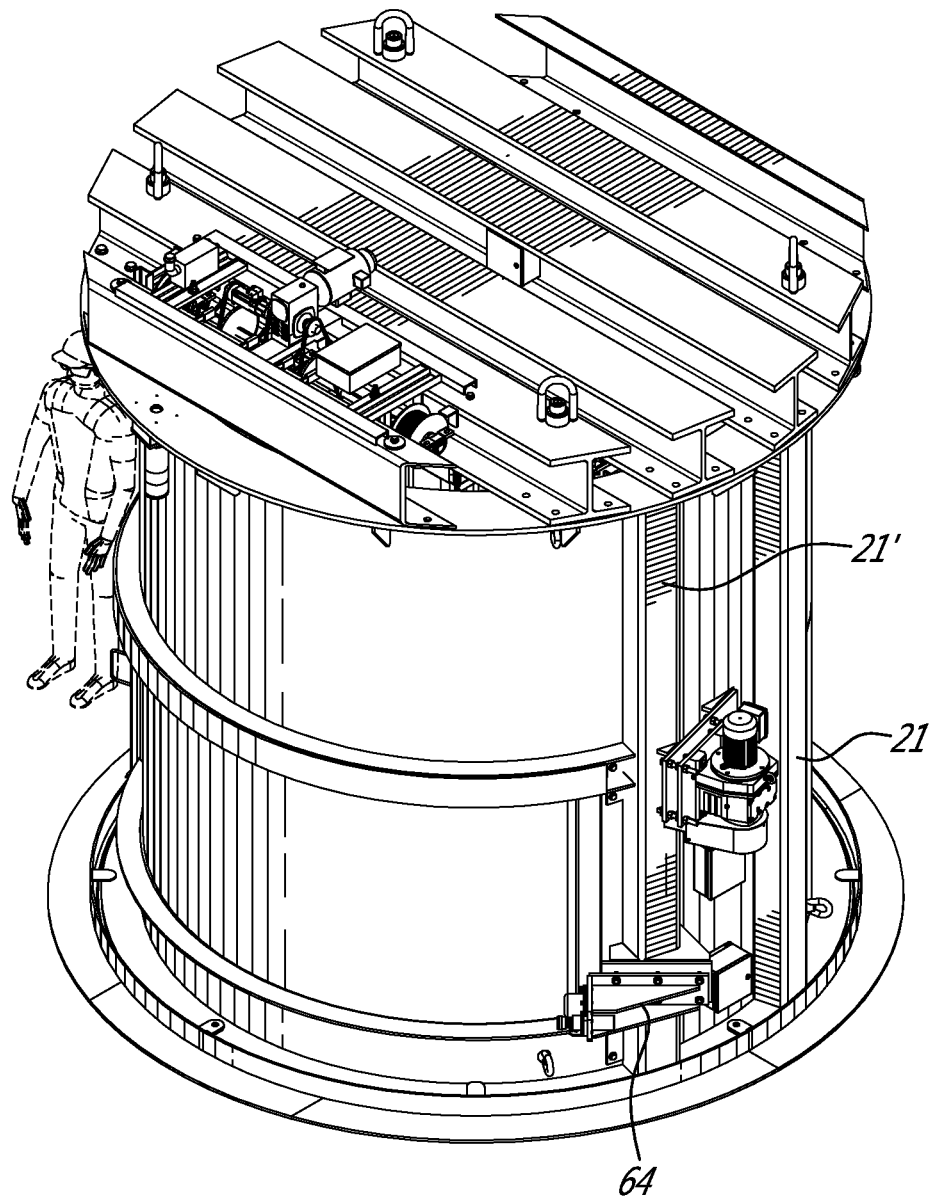
FIG. 4 is an isometric view of a tire explosion safety system shown with its door in close position and with its tire platform disposed inside the enclosure supporting a tire to be serviced.
Figure 17:
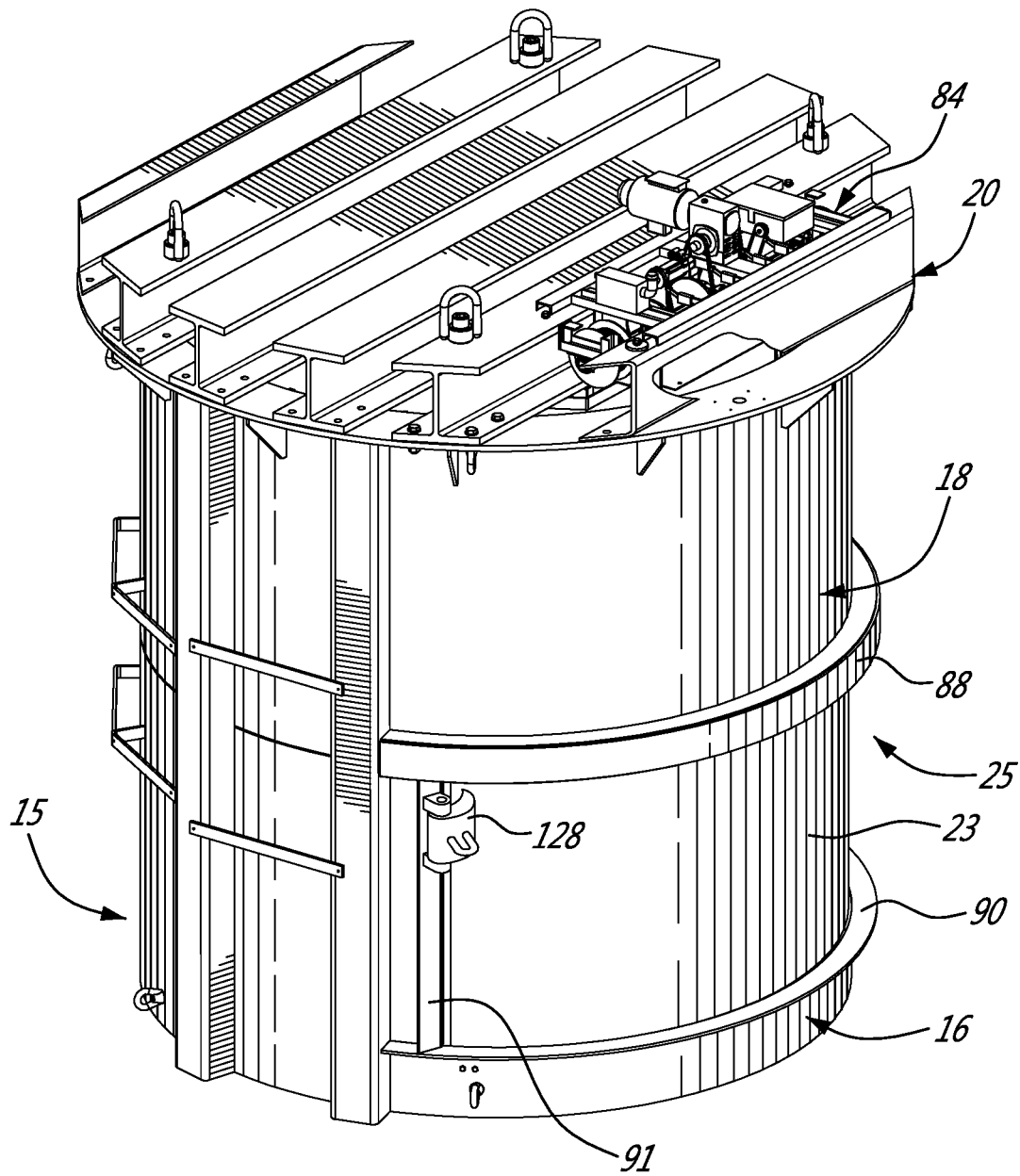
FIG. 17 is an isometric view of the body and top portions of the system enclosure with its door in close position, showing the beams as part of the enclosure top portion and door lifting device.

Turning back to FIGS. 11 and 12, the enclosure body portion 18 is provided with a slide arrangement generally designated at 82 cooperating with the sliding door 23 upon operation of the lifting device 84, to selectively move the sliding door 23 between an upper position associated with the door open position where the sliding door 23 is disposed above the main opening 25 as shown in FIGS. 1 and 2, and a lower position associated with the close position where the sliding door 23 is disposed against the main opening 25 as shown in FIGS. 4 and 5. It can be seen from FIGS. 17 and 18 that arcuate strengthening beam 88 and flange 90 can be provided on the enclosure body portion 18, horizontally extending respectively above and under the main opening (shown closed by door 23), which opening can be further laterally strengthened by vertically extending flanges 91, 91'.

Figure 10A:
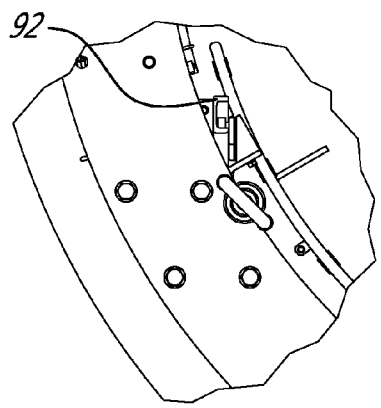
FIG. 10A is a detail view of one of the upper roller and rail assemblies as part of the door slide arrangement and proximity sensor provided on the enclosure body portion shown on the system of FIG. 10.
Figure 10B:
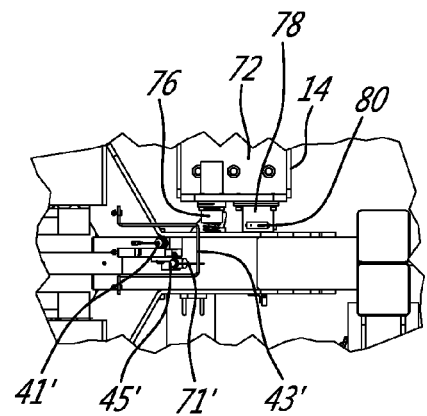
FIG. 10B is a detail view of the platform arm and second travel limiting unit provided on the system of FIG. 10.
Figure 21:
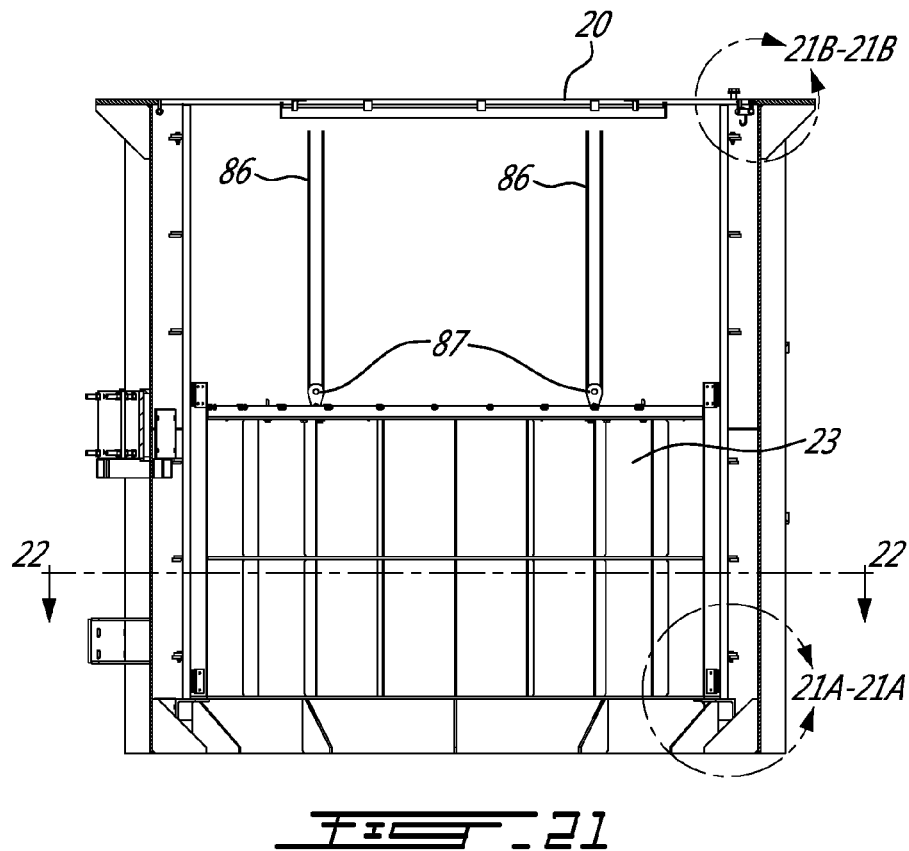
FIG. 21 is a cross-sectional view along section lines 21-21 of the enclosure shown in FIG. 18.
Figure 21A:
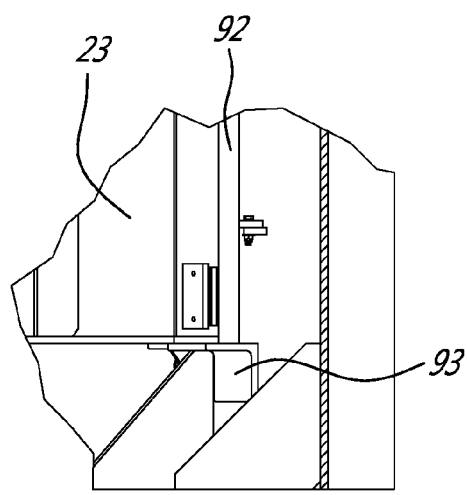
FIG. 21A is a detail view of one of the lower roller and rail assemblies as part of the door slide arrangement provided on the enclosure body portion shown on the enclosure of FIG. 21 with the door in its close position.

As better shown in FIGS. 24 and 25 in view of FIGS. 21, 21A, 22, 22A, 23 and 23A, the slide arrangement 82 includes a pair of rails 92, 92' secured to the inner surface of lateral wall 52 shown in FIGS. 11 and 12, in a parallel spaced relationship adjacent respective sides of main opening 25 shown in FIG. 1. A pair of elongate brackets 94, 94' is secured to respective ends 95, 95' of door 23, to each of which brackets is mounted lower and upper roller devices 96, 96', which are adapted to engage with rails 92, 92' at both ends of door 23 to provide sliding. As shown in FIGS. 10A and 11 in view of FIG. 12, so as to provide upper limit control required for opening travel of door 23, adjacent the upper end of rail 92 is mounted a first component 98 of an upper proximity sensor positioned to cooperate with a second component 98' mounted on the upper portion of door end 95'. Similarly, so as to provide lower limit control required for closing travel of door 23, adjacent the lower end of rail 92 is mounted a first component 99 of a lower proximity sensor positioned to cooperate with a second component 99' mounted on the lower portion of door end 95', and the lower part of door 23 is caused to abut on a stop 93 adjacent rail 92 as shown in FIG. 21A.

Figure 21B:
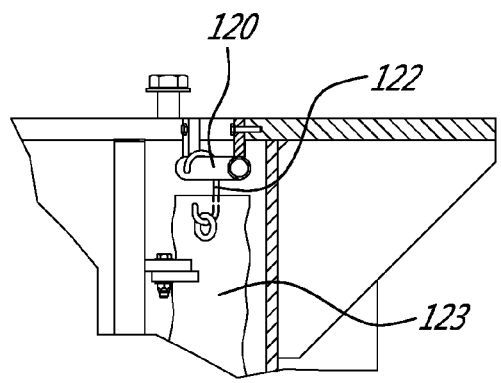
FIG. 21B is a detail view of one of the upper section of enclosure body as part of the enclosure of FIG. 21, showing the pole and hook assembly for holding the second noise barrier.
Figure 22:
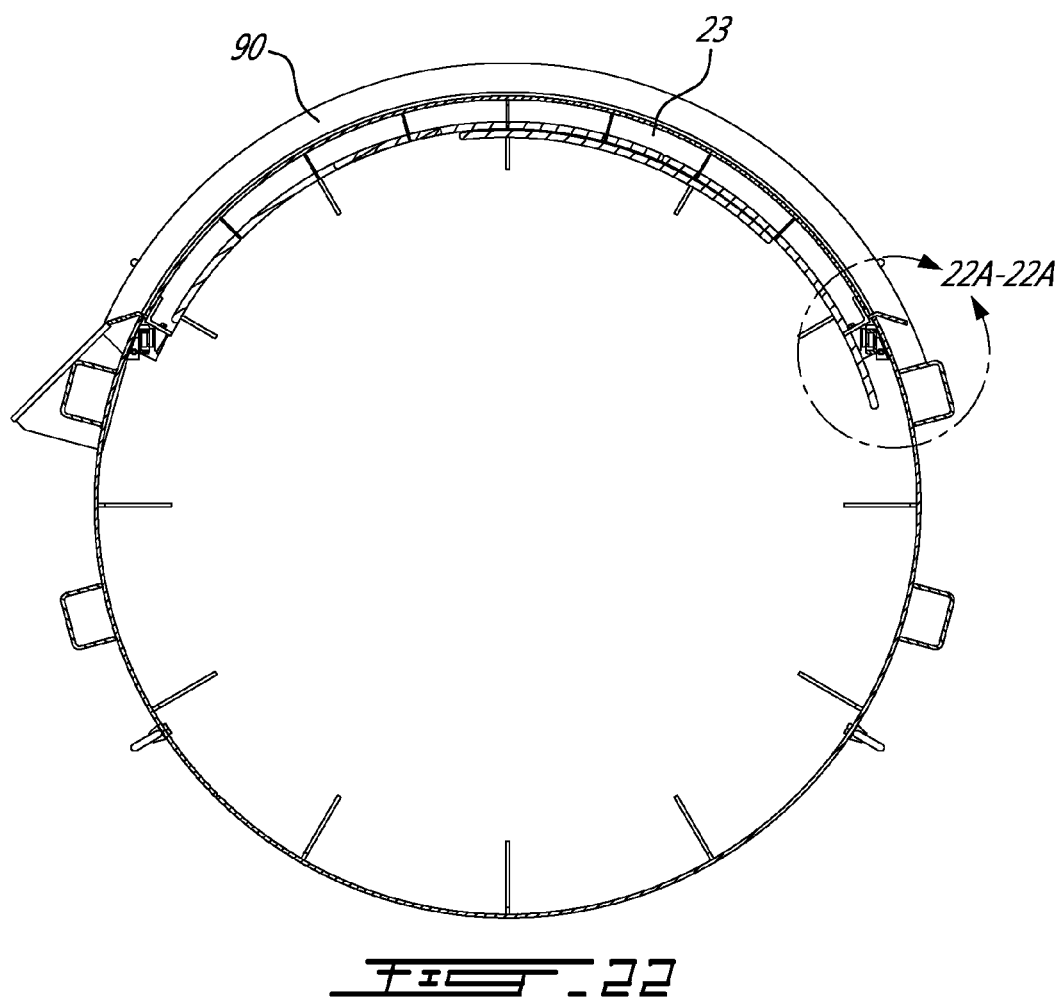
FIG. 22 is a cross-sectional view along section lines 22-22 of the enclosure shown in FIG. 21.
Figure 22A:
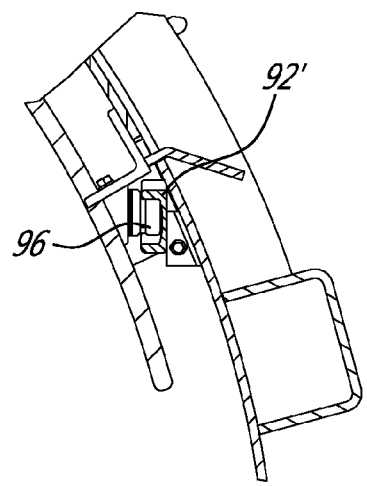
FIG. 22A is another detail view of one of the lower roller and rail assemblies as part of the door slide arrangement provided on the enclosure of FIG. 21.

Optionally, the inside surface of body portion may be covered by a second noise barrier disposed within the enclosure 15, such as a rubber curtain. For so doing, as shown in FIGS. 21 and 21B in view of FIG. 7B, a circular pole 120 mounted to enclosure top portion 20 and provided with hooks 122 passing through eyelets provided on second noise barrier 123 can be used. The inside surface of door 23 can also be covered by similar noise barrier. Optionally video cameras can be installed below and above the platform 28 to allow a system operator to inspect both side of the tire during servicing operations. Conveniently, as shown in FIG. 5 in view of FIG. 14, a pair of lower cameras 41 with appropriate lighting sources 45 may be secured to posts 62 using appropriate support 43, with their respective vision fields 49 being oriented upwardly to allow inspection of the bottom portion of a tire under servicing. Similarly, as shown in FIG. 5 in view of FIG. 10B, a pair of upper cameras 41' with appropriate lighting sources 45' may be secured to mounting plate 132 provided on the cartridge holder 125 shown in FIG. 16, using appropriate support 43', with their respective vision fields 49' being oriented downwardly to allow inspection of the top portion of a tire under servicing. The outputs of cameras 41, 41' can be linked through lines 71, 71' to a connector block 51 mounted on the enclosure top portion 20 shown in FIG. 1. Furthermore, instead of providing a removable support leg 121 as shown in FIG. 1, a safety mechanical lock 128 may be provided to ensure that the door 23 cannot move downward when brought to its fully open position, to provide safe operator access to inside the enclosure. Such lock may be provided with a sensor causing generation of an alarm whenever the lock in not in a locking position when the door is open.

Figure 28:
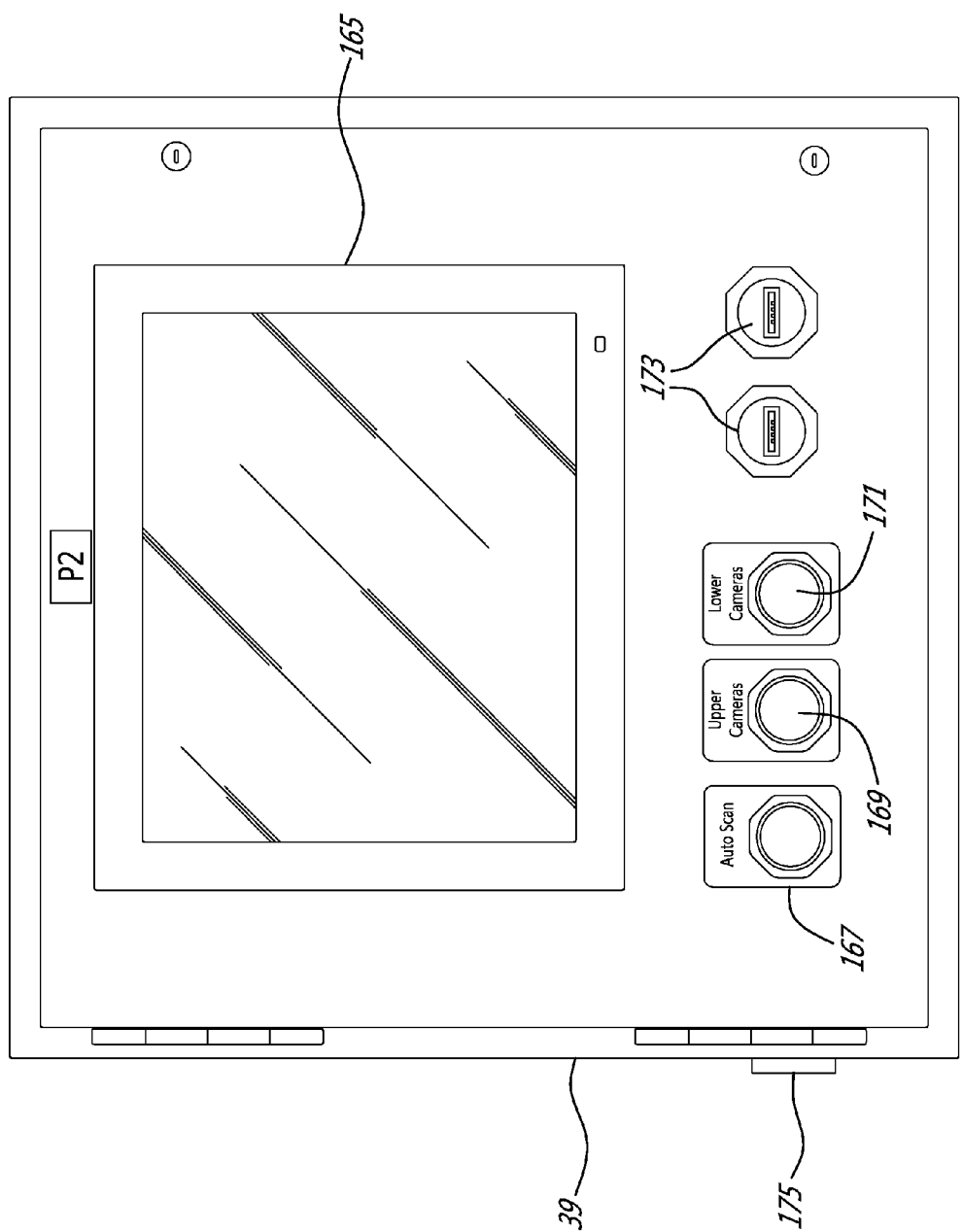
FIG. 28 shows an electrical control panel provided on the system of FIG. 1.

Referring now to FIG. 28, the electrical control panel 35 included in the presently described embodiment of safety system 10 is provided with the following devices: a manometer 137 for indicating the actual tire pressure, a display 139 indicating the target pressure for tire inflation, a main power electrical power switch 141, a yellow lighting push button 143 to activate tire inflation by maintaining hand pressure thereon, a control knob 145 for adjusting target pressure, a system-on green indicating light 147, a push button 149 to activate air purge by maintaining hand pressure thereon, a blue lighting push button 151 to reset the security system (after an emergency stop), a two-position selector 153 to activate door opening or door closing, a white push button 155 used to confirm start status of drive motors of tire support device and door lifting device, an emergency push button 157 (causing power supply interruption for motors and purge of inflation circuit outside the system), and a two-position selector 159 to activate the tire support for either displacing a tire inside or outside the system enclosure. A power cord socket 161 and optional external socket 163 for remote inflation control can be provided. Referring now to FIG. 29, the optional camera control panel 39 that may be included in the system is provided with the following devices: a computer with panel mount display 165, a push button 167 to activate an automatic scan mode for displaying in sequence tire sides images from all cameras linked to the control panel 39 through the connector block 51 shown in FIG. 1, a push button 169 for displaying tire side images from upper cameras, a push button 171 for displaying tire side images from lower cameras, USB ports 173 for external accessories such as a remote keyboard, and optional Ethernet port 175.

The invention claimed is:
1. A safety system for containment of explosion when servicing a tire mounted on a rim, comprising:

an enclosure capable of receiving a tire to be serviced and provided with openings to allow passage of air upon tire explosion;

a support device attached to said enclosure for contacting said tire to secure thereof in a servicing position within said enclosure and without contacting the rim;

a first energy absorbing unit attached to and located within said enclosure to face a first side of said rim and capable of substantially absorb kinetic energy of at least one first rim part ejected toward said first energy absorbing unit upon tire explosion; and a second energy absorbing unit attached to and located within said enclosure to face a second side of said rim and capable of substantially absorb kinetic energy of at least one second rim part and any portion of said tire ejected toward said second energy absorbing unit upon tire explosion;

wherein said support device includes a platform having a bearing surface contacting a first side of said tire and defining an opening substantially aligned with the first rim side to provide clearance for said first rim part elected toward said first energy absorbing unit upon tire explosion.

2. The safety system of claim 1, wherein said platform is attached to said enclosure through a displaceable mechanism operable between a first position wherein said platform is disposed outside said enclosure allowing placement of the tire on the support device, and a second position wherein said platform is disposed inside the enclosure to secure the tire in the servicing position.

3. The safety system of claim 2, wherein said platform is pivotally attached to said enclosure, said displaceable mechanism being a pivoting mechanism.

4. The safety system of claim 2, further comprising a stopper arrangement attached to and located within said enclosure to be disposed between said platform and a base portion of said enclosure in a close proximity relationship beneath said platform when the latter is disposed inside the enclosure, to limit the movement of said platform upon tire explosion.

5. The safety system of claim 1, wherein said first energy absorbing unit include one or more cartridges crushable upon impact of said ejected first rim part.

6. The safety system of claim 1, wherein said first energy absorbing unit include a plurality of cartridges crushable upon impact of said ejected first rim part, said cartridges being disposed in a substantially symmetrical arrangement to face corresponding peripheral portions of said rim first side.

7. The safety system of claim 6, wherein said crushable cartridges are covered by a noise barrier.

8. The safety system of claim 6, wherein said arrangement of crushable cartridges is symmetrical with reference to a central axis defined by said clearance opening to allow passage of air toward a base portion of said enclosure upon tire explosion.

9. The safety system of claim 1, wherein said second energy absorbing unit includes one or more cartridges crushable upon impact of said ejected second rim part and any ejected portion of said tire.

10. The safety system of claim 1, wherein said enclosure includes a base portion, a body portion and a top portion, said body portion defining a main opening through which said tire can be received within and removed from said enclosure, said enclosure further including a door operationally mounted with respect to said body portion so as to be movable from an open position giving access to said opening and a closed position for tire servicing.

11. The safety system of claim 10, wherein said air passage openings are provided on said top portion.

12. The safety system of claim 10, wherein said body portion and door are covered by a noise barrier disposed within said enclosure.

13. The safety system of claim 1, wherein said enclosure is of a generally cylindrical shape.

14. A safety system for containment of explosion when servicing a tire mounted on a rim, comprising:

an enclosure capable of receiving a tire to be serviced and provided with openings to allow passage of air upon tire explosion;

a support device attached to said enclosure for contacting said tire to secure thereof in a servicing position within said enclosure and without contacting the rim;

a first energy absorbing unit attached to and located within said enclosure to face a first side of said rim and capable of substantially absorb kinetic energy of at least one first rim part ejected toward said first energy absorbing unit upon tire explosion; and a second energy absorbing unit attached to and located within said enclosure to face a second side of said rim and capable of substantially absorb kinetic energy of at least one second rim part and any portion of said tire ejected toward said second energy absorbing unit upon tire explosion, wherein said second energy absorbing unit includes one or more cartridges crushable upon impact of said elected second rim part and any elected portion of said tire, and wherein said second energy absorbing unit further includes a holder for said cartridges, said holder being attached to an enclosure top portion.

15. The safety system of claim 14, wherein said holder is provided with a base tray on which said cartridges are disposed for spreading the energy upon impact of said ejected second rim part and any ejected portion of said tire.

16. The safety system of claim 15, wherein a plurality of arrangements of said cartridges are stacked and separated by one or more intermediary energy spreading trays.

17. A safety system for containment of explosion when servicing a tire mounted on a rim, comprising:

an enclosure capable of receiving a tire to be serviced and provided with openings to allow passage of air upon tire explosion;

a support device attached to said enclosure for contacting said tire to secure thereof in a servicing position within said enclosure and without contacting the rim;

a first energy absorbing unit attached to and located within said enclosure to face a first side of said rim and capable of substantially absorb kinetic energy of at least one first rim part elected toward said first energy absorbing unit upon tire explosion; and a second energy absorbing unit attached to and located within said enclosure to face a second side of said rim and capable of substantially absorb kinetic energy of at least one second rim part and any portion of said tire elected toward said second energy absorbing unit upon tire explosion;

wherein said enclosure includes a base portion, a body portion and a top portion, said body portion defining a main opening through which said tire can be received within and removed from said enclosure, said enclosure further including a door operationally mounted with respect to said body portion so as to be movable from an open position giving access to said opening and a closed position for tire servicing, and wherein said door is a sliding door coupled to a lifting device, said enclosure body portion being provided with a slide arrangement cooperating with said sliding door upon operation of said lifting device.

18. The safety system of claim 17, wherein said lifting device is operable to move the sliding door between an upper position associated with said door open position where the sliding door is disposed above said main opening, and a lower position associated with said close position where the sliding door is disposed against said opening.

19. A safety system for containment of explosion when servicing a tire mounted on a rim, comprising:

an enclosure capable of receiving a tire to be serviced and provided with openings to allow passage of air upon tire explosion;

a support device attached to said enclosure for contacting said tire to secure thereof in a servicing position within said enclosure and without contacting the rim;

a first energy absorbing unit attached to and located within said enclosure to face a first side of said rim and capable of substantially absorb kinetic energy of at least one first rim part elected toward said first energy absorbing unit upon tire explosion; and a second energy absorbing unit attached to and located within said enclosure to face a second side of said rim and capable of substantially absorb kinetic energy of at least one second rim part and any portion of said tire ejected toward said second energy absorbing unit upon tire explosion;

wherein said enclosure includes a base portion, a body portion and a top portion, said first energy absorbing unit being located under said support device in the servicing position, said second energy absorbing unit being located above said support device and said tire in the servicing position.

* * * * *